United States Patent
Chen

(10) Patent No.: US 11,118,913 B2
(45) Date of Patent: Sep. 14, 2021

(54) VEHICLE POSITIONING CORRECTION METHOD AND MOBILE DEVICE

(71) Applicant: Huawei Technologies Co., Ltd., Shenzhen (CN)

(72) Inventor: Xiaohan Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 226 days.

(21) Appl. No.: 16/342,663

(22) PCT Filed: Dec. 9, 2016

(86) PCT No.: PCT/CN2016/109324
§ 371 (c)(1),
(2) Date: Apr. 17, 2019

(87) PCT Pub. No.: WO2018/072279
PCT Pub. Date: Apr. 26, 2018

(65) Prior Publication Data
US 2019/0360816 A1     Nov. 28, 2019

(30) Foreign Application Priority Data
Oct. 19, 2016   (CN) .......................... 201610912249.9

(51) Int. Cl.
*G01C 21/28* (2006.01)
*G07C 5/02* (2006.01)

(52) U.S. Cl.
CPC ............ *G01C 21/28* (2013.01); *G07C 5/02* (2013.01)

(58) Field of Classification Search
CPC ...... G01C 21/28; G01C 21/206; G01C 21/30; G07C 5/02
See application file for complete search history.

(56) References Cited

U.S. PATENT DOCUMENTS

| 9,658,067 B2 * | 5/2017 | Ohkubo ................. G01P 15/18 |
| 2006/0114151 A1 | 6/2006 | Iwami |

(Continued)

FOREIGN PATENT DOCUMENTS

| CN | 101403620 A | 4/2009 |
| CN | 101696886 A | 4/2010 |

(Continued)

OTHER PUBLICATIONS

Vasiliy, Tereshkov; "An intuitive Approach to Inertial Sensor Bias Estimation"; Published 2012, Whole Document (Year: 2012).*

(Continued)

*Primary Examiner* — Peter D Nolan
*Assistant Examiner* — Kenneth M Dunne
(74) *Attorney, Agent, or Firm* — Conley Rose, P.C.

(57) ABSTRACT

A positioning method applied to a mobile device having a sensor system and a positioning system includes determining that the mobile device is in a preset state; determining a speed reference value of the mobile device based on data detected by the sensor system; determining a position reference value of the mobile device based on preset map data and an estimated positioning value that is output by the positioning system; and correcting, based on the speed reference value and the position reference value, an estimated speed value and the estimated positioning value that are output by the positioning system.

20 Claims, 13 Drawing Sheets

(56) References Cited

U.S. PATENT DOCUMENTS

| | | | |
|---|---|---|---|
| 2006/0282471 A1 | 12/2006 | Mark et al. | |
| 2009/0309793 A1* | 12/2009 | Loomis | G01C 21/30 342/357.57 |
| 2011/0112764 A1* | 5/2011 | Trum | G01C 21/3476 701/469 |
| 2012/0022780 A1* | 1/2012 | Kulik | G01C 25/00 701/498 |
| 2013/0325322 A1* | 12/2013 | Blumenberg | G01C 21/367 701/420 |
| 2015/0285639 A1* | 10/2015 | Basalamah | H04W 4/027 455/456.3 |
| 2016/0040992 A1* | 2/2016 | Palella | G01C 5/06 702/152 |
| 2016/0377437 A1* | 12/2016 | Brannstrom | G05D 1/0278 701/501 |
| 2019/0079539 A1* | 3/2019 | Sridhar | G05D 1/0278 |
| 2019/0316914 A1* | 10/2019 | Shin | G01C 21/30 |

FOREIGN PATENT DOCUMENTS

| | | | | |
|---|---|---|---|---|
| CN | 101796375 A | | 6/2010 | |
| CN | 102621584 A | | 8/2012 | |
| CN | 202599421 U | | 12/2012 | |
| CN | 103134494 | * | 6/2013 | G01C 21/06 |
| CN | 103134494 A | | 6/2013 | |
| CN | 103604435 A | | 2/2014 | |
| CN | 104180805 A | | 12/2014 | |
| CN | 104236566 A | | 12/2014 | |
| CN | 104575004 A | | 4/2015 | |
| CN | 105139644 A | | 12/2015 | |
| CN | 105509736 A | | 4/2016 | |
| CN | 105973243 A | | 9/2016 | |

OTHER PUBLICATIONS

Machine Translation and Abstract of Chinese Publication No. CN101403620, Apr. 8, 2009, 13 pages.
Machine Translation and Abstract of Chinese Publication No. CN102621584, Aug. 1, 2012, 14 pages.
le;2qMachine Translation and Abstract of Chinese Publication No. CN101696886, Apr. 21, 2010, 16 pages.
Machine Translation and Abstract of Chinese Publication No. CN103134494, Jun. 5, 2013, 29 pages.
Machine Translation and Abstract of Chinese Publication No. CN103604435, Feb. 26, 2014, 11 pages.
Machine Translation and Abstract of Chinese Publication No. CN104180805, Dec. 3, 2014, 16 pages.
Machine Translation and Abstract of Chinese Publication No. CN104575004, Apr. 29, 2015, 17 pages.
Machine Translation and Abstract of Chinese Publication No. CN105139644, Dec. 9, 2015, 14 pages.
Machine Translation and Abstract of Chinese Publication No. CN105509736, Apr. 20, 2016, 8 pages.
Machine Translation and Abstract of Chinese Publication No. CN105973243, Sep. 28, 2016, 15 pages.
Machine Translation and Abstract of Chinese Publication No. CN202599421, Dec. 12, 2012, 5 pages.
Foreign Communication From a Counterpart Application, PCT Application No. PCT/CN2016/109324, English Translation of International Search Report dated Mar. 22, 2017, 3 pages.
Foreign Communication From a Counterpart Application, PCT Application No. PCT/CN2016/109324, English Translation of Written Opinion dated Mar. 22, 2017, 4 pages.

* cited by examiner

Top view      Side view

Vehicle coordinate system

VEHICLE POSITIONING CORRECTION METHOD AND MOBILE DEVICE

This application is a National Stage of International Patent Application No. PCT/CN2016/109324 filed on Dec. 9, 2016, which claims priority to Chinese Patent Application No. 201610912249.9 filed on Oct. 19, 2016. Both of the aforementioned applications are hereby incorporated by reference in their entireties.

TECHNICAL FIELD

The present invention relates to the field of communications technologies, and in particular, to a positioning method and a mobile device.

BACKGROUND

When a vehicle is located outdoors, vehicle positioning and navigation are implemented by using a satellite positioning system. After the vehicle enters an indoor parking lot, the satellite positioning system is out of service because a building attenuates and shields a satellite signal. In the indoor parking lot, a user needs empty parking space guiding, vehicle search, out of garage guiding, and the like. Therefore, indoor vehicle positioning system is required.

A positioning system that uses a radio signal positioning technology is provided in the prior art. In the radio signal positioning technology, a position of a user is mainly determined by using a method such as triangulation, trilateration, or fingerprint matching and by using strength, a receiving time, an arrival angle, and a fingerprint feature that are of a radio signal received by a mobile device. However, a precondition for radio signal positioning is a large radio signal coverage density in an environment, and signals of a plurality of wireless access points (Access Point, AP) can be received at a same place. Therefore, there is a requirement for infrastructure installation of the wireless AP, and maintenance costs are high. In addition, a positioning time lag and an inaccurate positioning result are caused due to multipath reflection of a radio signal, unstable signal source power, and signal attenuation caused by a vehicle.

A positioning system that uses an inertial navigation technology is further provided in the prior art. A motion status (an acceleration, a rotation angular velocity, or a motion direction) of a vehicle is measured by using an inertial navigation sensor (an accelerometer, a gyroscope, or a magnetometer), and a position of the vehicle is calculated through dead reckoning based on a known initial position. However, due to impacts of a sensor bias and noise measurement, and an integral function, positioning error accumulation exists in inertial navigation, and a positioning error gradually increases over time.

A positioning system that integrates the inertial navigation technology and the radio signal positioning technology is further provided in the prior art, so that an error in inertial navigation positioning is corrected through radio signal positioning, and stability and continuity of radio signal positioning are improved through inertial navigation positioning. Although such integrated positioning system may reduce a positioning error in the inertial navigation technology, the integrated positioning system is also dependent on dense radio signal coverage. Therefore, disadvantages such as a positioning time lag and an inaccurate positioning result existed when positioning is performed by using the radio signal positioning technology still cannot be overcome.

Therefore, how to resolve the foregoing problems existing in the positioning system in the prior art and improve positioning precision is a problem that needs to be urgently researched and resolved in the industry.

SUMMARY

This specification provides a positioning method and a mobile device, so as to improve positioning precision.

According to a first aspect, a positioning method is provided, and is applied to a mobile device having a sensor system and a positioning system, and the method includes: determining that the mobile device is in a preset state; determining a speed reference value of the mobile device based on data detected by the sensor system, and determining a position reference value of the mobile device based on preset map data and an estimated positioning value that is output by the positioning system; and correcting, based on the speed reference value and the position reference value, an estimated speed value and the estimated positioning value that are output by the positioning system.

It can be learned that according to the solution provided in this application, each time it is determined that the mobile device is in the preset state, the mobile device can correct, by using the speed reference value obtained based on the data detected by the sensor system and the position reference value obtained based on the estimated positioning value output by the positioning system and the preset map data, the estimated speed value and the estimated positioning value that are output by the positioning system. Because the speed reference value is directly obtained based on real-time data that is detected by the sensor system when the mobile device is in the preset state, compared with the estimated speed value output by the positioning system, the speed reference value is not affected by error accumulation in the system, and is not limited by a positioning technology used in the positioning system. In addition, the preset map data reflects an actual geographical position status. When a terminal device is in the preset state, the position reference value obtained by combining the estimated positioning value and the preset map data can actually reflect a geographical position at which the mobile device is currently located. Therefore, according to the positioning solution provided in this application, the estimated speed value and the estimated positioning value are corrected by using the speed reference value and the position reference value, so that positioning precision can be effectively improved.

In a possible implementation, the method further includes: performing bias compensation on the sensor system based on at least one of the speed reference value or the position reference value.

In a possible implementation, the preset state may be set based on a geographical position, in the preset map data, at which motion of a mobile device that passes through the geographical position has a motion feature that can be identified, and/or based on a motion feature of motion of the mobile device. A mobile device located in a vehicle is used as an example. From a perspective of a geographical position, when the vehicle passes through a position such as a speed bump, a road turning point, or a cross-floor channel, motion of the vehicle has a motion feature different from that at another geographical position. In addition, at the positions, the mobile device may obtain the speed reference value based on sensor data through calculation, and may obtain accurate positioning of the positions by using the preset map data. Further, from a perspective of motion of the vehicle, when the vehicle stops, the vehicle has a feature that a fixed speed is zero. Therefore, the preset state that is set based on the geographical positions and/or based on the motion feature of the vehicle can provide a reference basis for subsequent correction of the positioning system.

In a possible implementation, the preset state includes: a vehicle in which the mobile device is located passes through a speed bump; or a vehicle in which the mobile device is located passes through a road turning point; or a vehicle in which the mobile device is located passes through a cross-floor channel.

In a possible implementation, when the preset state is that the vehicle in which the mobile device is located passes through a speed bump, the determining a speed reference value of the mobile device based on data detected by the sensor system includes: based on times at which a front wheel and a rear wheel of the vehicle respectively pass through the speed bump and that are detected by the sensor system, obtaining the speed reference value by dividing a value of a distance between the front wheel and the rear wheel of the vehicle in which the mobile device is located by an absolute value of a time difference between the times at which the front wheel and the rear wheel of the vehicle pass through the speed bump; or when the preset state is that the vehicle in which the mobile device is located passes through a road turning point, the determining a speed reference value of the mobile device based on data detected by the sensor system includes: based on a centripetal acceleration value and a rotation angular velocity value that are detected by the sensor system, obtaining the speed reference value by dividing the centripetal acceleration value by the rotation angular velocity value; or when the preset state is that the vehicle in which the mobile device is located passes through a cross-floor channel, the determining a speed reference value of the mobile device based on data detected by the sensor system includes: based on a start time and an end time at which the vehicle passes through the cross-floor channel and that are detected by the sensor system, obtaining the speed reference value by dividing a length value of the cross-floor channel by an absolute value of a time difference between the start time and the end time at which the vehicle in which the mobile device is located passes through the cross-floor channel.

In a possible implementation, when the preset state is that the vehicle in which the mobile device is located passes through a speed bump, the determining a position reference value of the mobile device based on preset map data and an estimated positioning value that is output by the positioning system includes: searching for, based on position distribution of a speed bump in the preset map data, a position of a speed bump closest to the estimated positioning value output by the positioning system, and determining the position of the found speed bump as the position reference value of the mobile device; or when the preset state is that the vehicle in which the mobile device is located passes through a road turning point, the determining a position reference value of the mobile device based on preset map data and an estimated positioning value that is output by the positioning system includes: searching for, based on position distribution of a road turning point in the preset map data, a position of a road turning point closest to the estimated positioning value output by the positioning system, and determining the position of the found road turning point as the position reference value of the mobile device; or when the preset state is that the vehicle in which the mobile device is located passes through a cross-floor channel, the determining a position reference value of the mobile device based on preset map data and an estimated positioning value that is output by the positioning system includes: searching for, based on position distribution of a cross-floor channel in the preset map data, a position of a cross-floor channel closest to the estimated positioning value output by the positioning system, and determining the position of the found cross-floor channel as the position reference value of the mobile device.

In a possible implementation, the determining that the mobile device is in a preset state includes:

if it is determined that data detected by at least one sensor in the sensor system suddenly changes twice in an oscillation manner in preset duration, determining that the vehicle in which the mobile device is located passes through a speed bump; or if it is determined that an absolute value of a rotation angular velocity detected by the sensor system is greater than a rotation angular velocity threshold, or if it is determined that an absolute value of a centripetal acceleration detected by the sensor system is greater than a centripetal acceleration threshold, determining that the vehicle in which the mobile device is located passes through a road turning point; or if it is determined that an absolute value of a component that is in a direction perpendicular to a vehicle chassis and that is of an acceleration value detected by the sensor system is less than an acceleration threshold, determining that the vehicle in which the mobile device is located passes through a cross-floor channel.

It can be learned that the solution provided in this application can be applied to vehicle positioning. The mobile device can detect, by using the sensor system, whether a vehicle passes through a position (for example, a speed bump, a turning point, or a cross-floor channel) having a natural feature in an environment, whether a vehicle stops, or the like, and further obtain a position reference value and a speed reference value of the vehicle, so as to correct an estimated positioning value and an estimated speed value of the vehicle by using the position reference value and the speed reference value, thereby improving vehicle positioning precision.

According to a second aspect, a positioning method is provided, and is applied to a mobile device having a sensor system and a positioning system, and the method includes:

determining that the mobile device is in a preset state; determining a speed reference value of the mobile device based on data detected by the sensor system; and correcting, based on the speed reference value, an estimated speed value output by the positioning system.

In a possible implementation, the method further includes: performing bias compensation on the sensor system based on the speed reference value.

In a possible implementation, the preset state may be set based on a geographical position, in the preset map data, at which motion of a mobile device that passes through the geographical position has a motion feature that can be identified, and/or based on a motion feature of motion of the mobile device. A mobile device located in a vehicle is used as an example. From a perspective of a geographical position, when the vehicle passes through a position such as a speed bump, a road turning point, or a cross-floor channel, motion of the vehicle has a motion feature different from that at another geographical position. In addition, at the positions, the mobile device may obtain the speed reference value based on sensor data through calculation. Further, from a perspective of motion of the vehicle, when the vehicle stops, the vehicle has a feature that a fixed speed is zero. Therefore, the preset state that is set based on the geographical positions and/or based on the motion feature of the vehicle can provide a reference basis for subsequent correction of the positioning system.

In a possible implementation, the preset state includes: a vehicle in which the mobile device is located passes through a speed bump; or a vehicle in which the mobile device is located passes through a road turning point; or a vehicle in which the mobile device is located passes through a cross-floor channel; or a vehicle in which the mobile device is located stops.

In a possible implementation, when the preset state is that the vehicle in which the mobile device is located passes through a speed bump, the determining a speed reference value of the mobile device based on data detected by the sensor system includes: based on times at which a front wheel and a rear wheel of the vehicle respectively pass through the speed bump and that are detected by the sensor system, obtaining the speed reference value by dividing a value of a distance between the front wheel and the rear wheel of the vehicle in which the mobile device is located by an absolute value of a time difference between the times at which the front wheel and the rear wheel of the vehicle pass through the speed bump; or when the preset state is that the vehicle in which the mobile device is located passes through a road turning point, the determining a speed reference value of the mobile device based on data detected by the sensor system includes: based on a centripetal acceleration value and a rotation angular velocity value that are detected by the sensor system, obtaining the speed reference value by dividing the centripetal acceleration value by the rotation angular velocity value; or when the preset state is that the vehicle in which the mobile device is located passes through a cross-floor channel, the determining a speed reference value of the mobile device based on data detected by the sensor system includes: based on a start time and an end time at which the vehicle passes through the cross-floor channel and that are detected by the sensor system, obtaining the speed reference value by dividing a length value of the cross-floor channel by an absolute value of a time difference between the start time and the end time at which the vehicle in which the mobile device is located passes through the cross-floor channel; or when the preset state is that the vehicle in which the mobile device is located stops, the determining a speed reference value of the mobile device based on data detected by the sensor system includes: when a variance of a plurality of pieces of consecutive data in at least one spatial dimension that are detected by the sensor system is less than a threshold, determining that the speed reference value of the mobile device is zero.

In a possible implementation, the determining that the mobile device is in a preset state includes:

if it is determined that data detected by at least one sensor in the sensor system suddenly changes twice in an oscillation manner in preset duration, determining that the vehicle in which the mobile device is located passes through a speed bump; or if it is determined that an absolute value of a rotation angular velocity detected by the sensor system is greater than a rotation angular velocity threshold, or if it is determined that an absolute value of a centripetal acceleration detected by the sensor system is greater than a centripetal acceleration threshold, determining that the vehicle in which the mobile device is located passes through a road turning point; or if it is determined that an absolute value of a component that is in a direction perpendicular to a vehicle chassis and that is of an acceleration value detected by the sensor system is less than an acceleration threshold, determining that the vehicle in which the mobile device is located passes through a cross-floor channel; or if it is determined that the variance of the plurality of pieces of consecutive data in the at least one spatial dimension that are detected by the sensor system is less than the threshold, determining that the vehicle in which the mobile device is located stops.

According to a third aspect, a positioning method is provided, and is applied to a mobile device having a sensor system and a positioning system, and the method includes:

determining that the mobile device is in a preset state; determining a position reference value of the mobile device based on preset map data and an estimated positioning value that is output by the positioning system; and correcting, based on the position reference value, the estimated positioning value output by the positioning system.

In a possible implementation, the method further includes: performing bias compensation on the sensor system based on the position reference value.

In a possible implementation, the preset state includes: a vehicle in which the mobile device is located passes through a speed bump; or a vehicle in which the mobile device is located passes through a road turning point; or a vehicle in which the mobile device is located passes through a cross-floor channel.

In a possible implementation, when the preset state is that the vehicle in which the mobile device is located passes through a speed bump, the determining a position reference value of the mobile device based on preset map data and an estimated positioning value that is output by the positioning system includes: searching for, based on position distribution of a speed bump in the preset map data, a position of a speed bump closest to the estimated positioning value output by the positioning system, and determining the position of the found speed bump as the position reference value of the mobile device; or when the preset state is that the vehicle in which the mobile device is located passes through a road turning point, the determining a position reference value of the mobile device based on preset map data and an estimated positioning value that is output by the positioning system includes: searching for, based on position distribution of a road turning point in the preset map data, a position of a road turning point closest to the estimated positioning value output by the positioning system, and determining the position of the found road turning point as the position reference value of the mobile device; or when the preset state is that the vehicle in which the mobile device is located passes through a cross-floor channel, the determining a position reference value of the mobile device based on preset map data and an estimated positioning value that is output by the positioning system includes: searching for, based on position distribution of a cross-floor channel in the preset map data, a position of a cross-floor channel closest to the estimated positioning value output by the positioning system, and determining the position of the found cross-floor channel as the position reference value of the mobile device.

In a possible implementation, the determining that the mobile device is in a preset state includes:

if it is determined that data detected by at least one sensor in the sensor system suddenly changes twice in an oscillation manner in preset duration, determining that the vehicle in which the mobile device is located passes through a speed bump; or if it is determined that an absolute value of a rotation angular velocity detected by the sensor system is greater than a rotation angular velocity threshold, or if it is determined that an absolute value of a centripetal acceleration detected by the sensor system is greater than a centripetal acceleration threshold, determining that the vehicle in which the mobile device is located passes through a road turning point; or if it is determined that an absolute value of a component that is in a direction perpendicular to a vehicle chassis and that is of an acceleration value detected by the sensor system is less than an acceleration threshold, determining that the vehicle in which the mobile device is located passes through a cross-floor channel.

According to a fourth aspect, a mobile device having a sensor system and a positioning system is provided, and the mobile device includes a module configured to perform the method according to any one of the first aspect or the possible implementations of the first aspect. Based on a same inventive concept, for a problem-resolving principle and beneficial effects of the mobile device, refer to the implementation and the brought beneficial effects of the method according to the first aspect and the possible implementations of the first aspect. Repeated parts are not described again.

According to a fifth aspect, a mobile device having a sensor system and a positioning system is provided, and the mobile device includes a module configured to perform the method according to any one of the first aspect or the possible implementations of the first aspect. Based on a same inventive concept, for a problem-resolving principle and beneficial effects of the mobile device, refer to the implementation and the brought beneficial effects of the method according to the second aspect and the possible implementations of the second aspect. Repeated parts are not described again.

According to a sixth aspect, a mobile device having a sensor system and a positioning system is provided, and the mobile device includes a module configured to perform the method according to any one of the first aspect or the possible implementations of the first aspect. Based on a same inventive concept, for a problem-resolving principle and beneficial effects of the mobile device, refer to the implementation and the brought beneficial effects of the method according to the third aspect and the possible implementations of the third aspect. Repeated parts are not described again.

According to a seventh aspect, a mobile device is provided, and the mobile device includes: one or more processors, a sensor system, a positioning system, a memory, a bus system, and one or more programs, where the one or more processors, the sensor system, the positioning system, and the memory are connected by using the bus system, the one or more programs are stored in the memory, the one or more programs include an instruction, and the mobile device performs the positioning method according to the foregoing aspects and the possible implementations of the aspects when the processor executes the instruction. For problem-resolving implementations and beneficial effects of the mobile device, refer to the implementations of the foregoing aspects and the possible positioning methods in the aspects and the brought beneficial effects. Therefore, for implementation of the mobile device, refer to the implementation of the foregoing aspects and the possible positioning methods in the aspects. Repeated parts are not described again.

According to an eighth aspect, a computer readable storage medium storing one or more programs is provided, where the one or more programs include an instruction, and a mobile device performs the positioning method according to the foregoing aspects and the possible implementations of the aspects when the mobile device executes the instruction.

According to a ninth aspect, a graphical user interface on a mobile device is provided, where the mobile device includes a display, a sensor system, a positioning system, a memory, a plurality of application programs, and one or more processors configured to execute one or more programs stored in the memory, the graphical user interface includes a user interface that is displayed by using the positioning method according to the foregoing aspects and the possible implementations of the aspects, and the display includes a touch-sensitive surface and a display screen.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 4 (b) is a schematic side view of a vehicle coordinate system according to some embodiments of the present invention;

FIG. 5 (b) is a schematic diagram of an acceleration signal that is detected by a sensor on an axis when a vehicle passes through a speed bump according to some embodiments of the present invention;

FIG. 6 (b) is a schematic diagram of data measured by an accelerometer and data measured by a gyroscope when a vehicle passes through a road turning point according to some embodiments of the present invention;

DESCRIPTION OF EMBODIMENTS

Figure 1:
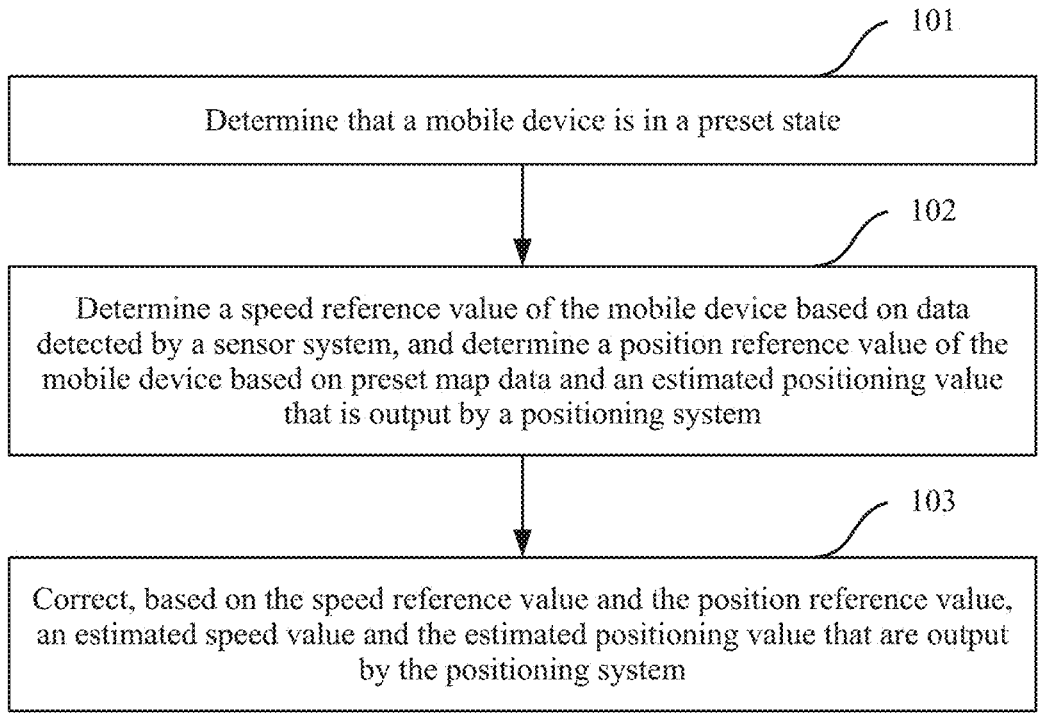
FIG. 1 is a schematic flowchart of a positioning method according to some embodiments of the present invention.

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

For problems existing in indoor radio signal positioning in the prior art, such as slow deployment, high maintenance costs, required signal coverage, a limited applicable place, and a positioning time lag, and problems existing in inertial navigation such as a sensor bias and error accumulation in dead reckoning, the embodiments of the present invention provide a positioning method and a mobile device, so as to resolve the foregoing problems existing in an existing positioning technology, and improve positioning precision.

Specifically, a positioning solution provided in some embodiments of the present invention may be applied to a mobile device having a sensor system and a positioning system. When determining that the mobile device is in a preset state, the mobile device determines a speed reference value of the mobile device based on data detected by the sensor system, and determines a position reference value of the mobile device based on preset map data and an estimated positioning value that is output by the positioning system, so as to correct, by using the speed reference value and the position reference value, an estimated speed value and the estimated positioning value that are output by the positioning system.

It should be understood that the preset map data may be understood as follows: The preset map data is pre-stored in the mobile device, and when reaching a place corresponding to the preset map data, the mobile device triggers the preset map data, or a user manually enables the preset map data by using the mobile device; or the mobile device reads a corresponding identifier or label to enable pre-stored map data, or the mobile device reads a corresponding identifier or label to automatically download corresponding map data or the mobile device reaches a corresponding place and receives map data sent by a third-party device.

It should be understood that the sensor system includes at least an accelerometer, a gyroscope, another necessary component, and a communications interface. The sensor system can establish a communication connection to at least one processor and the positioning system by using the communications interface.

It should be understood that the positioning system includes at least a module having a positioning function, a necessary component, and a communications interface. The positioning system can establish a communication connection to at least one processor and the sensor system by using the communications interface.

It can be learned that according to the positioning solution provided in the embodiments of the present invention, each time it is determined that the mobile device is in the preset state, the mobile device can correct, by using the speed reference value obtained based on the data detected by the sensor system and the position reference value obtained based on the estimated positioning value output by the positioning system and the preset map data, the estimated speed value and the estimated positioning value that are output by the positioning system. Because the speed reference value is directly obtained based on real-time data that is detected by the sensor system when the mobile device is in the preset state, compared with the estimated speed value output by the positioning system, the speed reference value is not affected by error accumulation in the system, and is not limited by a positioning technology used in the positioning system. In addition, the preset map data reflects an actual geographical position status. When a terminal device is in the preset state, the position reference value obtained by combining the estimated positioning value and the preset map data can actually reflect a geographical position at which the mobile device is currently located. Therefore, according to the positioning solution provided in the embodiments of the present invention, the estimated speed value and the estimated positioning value are corrected by using the speed reference value and the position reference value, so that positioning precision can be effectively improved.

Specifically, in a possible implementation, the preset state may be set based on a geographical position, in the preset map data, at which motion of a mobile device that passes through the geographical position has a motion feature that can be identified, and/or based on a motion feature of motion of the mobile device. A mobile device located in a vehicle is used as an example. From a perspective of a geographical position, when the vehicle passes through a position such as a speed bump, a road turning point, or a cross-floor channel, motion of the vehicle has a motion feature different from that at another geographical position. In addition, at the positions, the mobile device may obtain the speed reference value based on sensor data through calculation, and may obtain accurate positioning of the positions by using the preset map data. Further, from a perspective of motion of the vehicle, when the vehicle stops, the vehicle has a feature that a fixed speed is zero. Therefore, the preset state that is set based on the geographical positions and/or based on the motion feature of the vehicle can provide a reference basis for subsequent correction of the positioning system.

In consideration of disadvantages of indoor vehicle positioning in the prior art, the positioning solution provided in the embodiments of the present invention may be applied to indoor vehicle positioning. An estimated speed and positioning estimation that are output by an existing positioning system are corrected, so that positioning precision of indoor vehicle positioning is improved.

Specifically, when the positioning solution provided in the embodiments of the present invention is applied to a vehicle positioning scenario, the mobile device having the sensor system and the positioning system may be located in a vehicle (for example, an in-vehicle mobile device). The positioning solution provided in the embodiments of the present invention may be implemented through software programming or a combination of software and hardware, for example, may be implemented as software installed or integrated in the mobile device or a combination, of software and hardware, that is installed or integrated in the mobile device.

Considering that when the vehicle passes through positions having a natural feature such as a speed bump, a turning point, and a cross-floor channel during travelling, a vehicle traveling parameter such as a speed, an acceleration, or an attitude of the vehicle may have a distinctive change feature, states of the vehicle existed when the vehicle passes through the positions having a natural feature can be identified. Therefore, in the embodiments of the present invention that are applied to the vehicle positioning scenario, the preset state corresponding to the mobile device may be set based on a position having a natural feature in a traveling environment. For example, the preset state may be set as follows: The vehicle in which the mobile device is located passes through a speed bump, the vehicle in which the mobile device is located turns a corner, the vehicle in which the mobile device is located passes through a cross-floor channel, or the like.

Specifically, in a traveling process of the vehicle, the mobile device may detect, by using a sensor (for example, an accelerometer or a gyroscope), whether the vehicle reaches or passes through the positions having a natural feature in an environment, and may determine a speed reference value and a position reference value of the vehicle by using data that is detected by the sensor when the vehicle passes through the positions having a natural feature and with reference to actual geographical position distribution of the positions having a natural feature, so as to correct, by using the speed reference value and the position reference value, an estimated positioning value and an estimated speed value that are output by a positioning system configured on the vehicle, thereby effectively improving positioning precision.

The existing positioning system usually performs positioning estimation based on an inertial navigation technology, a radio signal positioning technology, or a technology that integrates inertial navigation and radio signal positioning, to obtain an estimated speed value and an estimated positioning value. However, current radio signal positioning has problems such as slow deployment, high maintenance costs, required signal coverage, a limited applicable place, and a positioning time lag, and inertial navigation has problems such as a sensor bias and error accumulation in dead reckoning. Therefore, it can be learned that when the positioning solution provided in the embodiments of the present invention is applied to a vehicle positioning scenario, an estimated value of the positioning system can be corrected by using a parameter value that is determined when a vehicle is located at a preset position, so as to improve positioning precision. Compared with a current solution in which the positioning system performs positioning by using the radio signal positioning technology, the positioning solution provided in the embodiments of the present invention is independent of radio signal distribution, and has a wide application range. Compared with inertial navigation positioning, positioning estimation is corrected by using a natural feature of an environment, so as to compensate for a sensor bias in real time and correct a dead reckoning error in inertial navigation in real time.

The following describes the embodiments of the present invention in detail with reference to accompanying drawings.

FIG. 1 is a schematic flowchart of a positioning method according to some embodiments of the present invention, and the procedure may be implemented by using software, hardware, or a combination of software and hardware. Specifically, for example, a function module installed or integrated in a mobile device or a mobile device may perform the procedure shown in FIG. 1, and the mobile device configured to implement the procedure may have a sensor system and a positioning system.

As shown in FIG. 1, the procedure includes the following steps:

Step 101: The mobile device determines that the mobile device is in a preset state.

Step 102: The mobile device determines a speed reference value of the mobile device based on data detected by the sensor system, and determines a position reference value of the mobile device based on preset map data and an estimated positioning value that is output by the positioning system.

Step 103: The mobile device corrects, based on the speed reference value and the position reference value, an estimated speed value and the estimated positioning value that are output by the positioning system.

Figure 2:
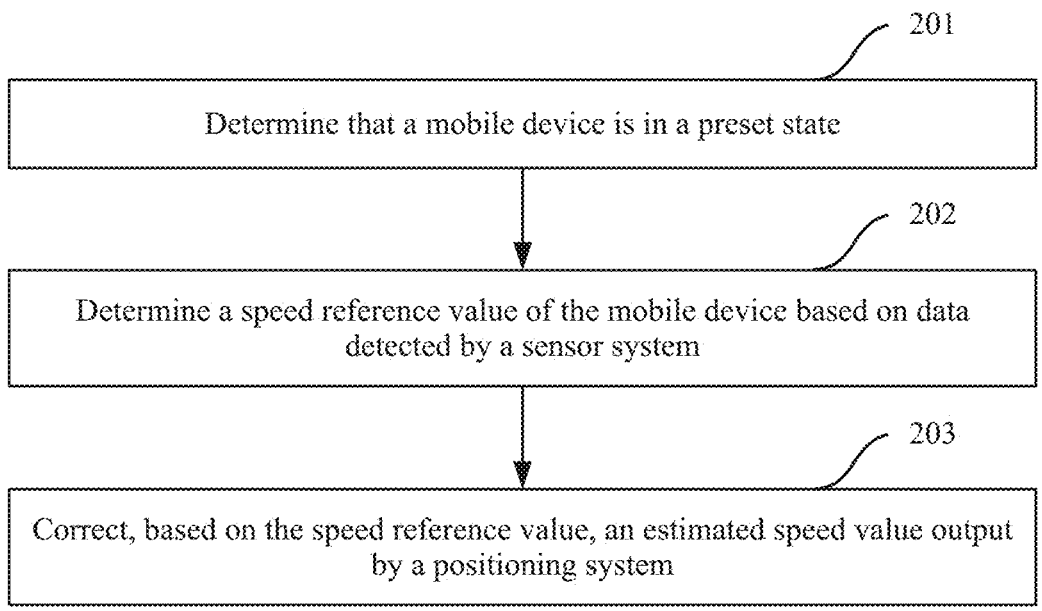
FIG. 2 is a schematic flowchart of a positioning method according to some other embodiments of the present invention.

Based on a same technical concept, FIG. 2 is a schematic flowchart of a positioning method according to some other embodiments of the present invention, and the procedure may also be implemented by using software, hardware, or a combination of software and hardware. Specifically, for example, a function module installed or integrated in a mobile device or a mobile device may perform the procedure shown in FIG. 2, and the mobile device configured to implement the procedure may have a sensor system and a positioning system.

As shown in FIG. 2, the procedure includes the following steps:

Step 201: The mobile device determines that the mobile device is in a preset state.

Step 202: The mobile device determines a speed reference value of the mobile device based on data detected by the sensor system.

Step 203: The mobile device corrects, based on the speed reference value, an estimated speed value output by the positioning system.

Figure 3:
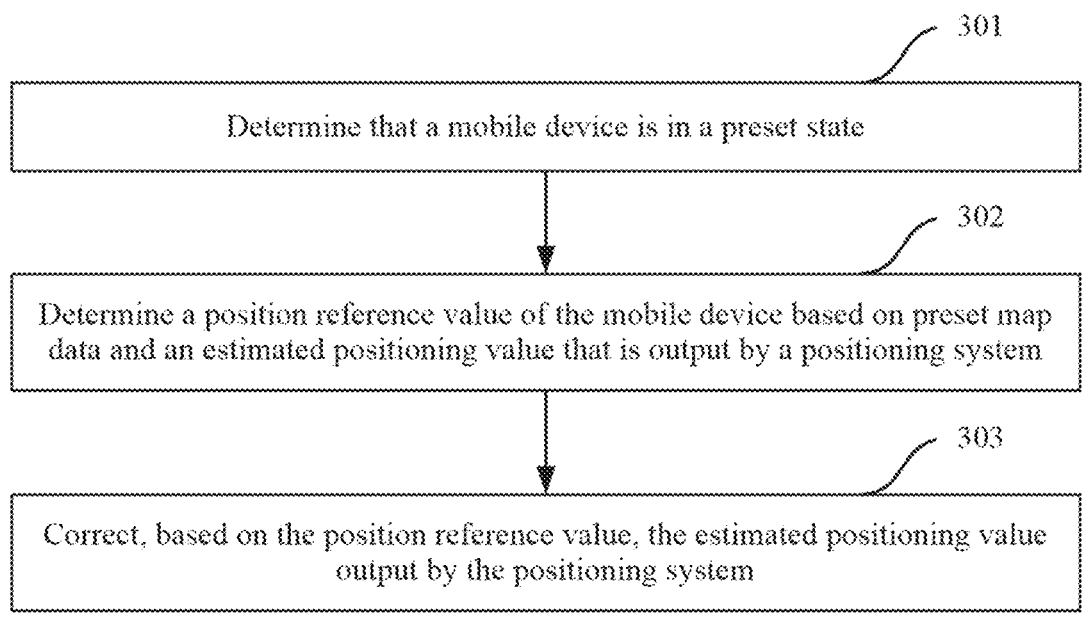
FIG. 3 is a schematic flowchart of a positioning method according to some other embodiments of the present invention.

Based on a same technical concept, FIG. 3 is a schematic flowchart of a positioning method according to some other embodiments of the present invention, and the procedure may also be implemented by using software, hardware, or a combination of software and hardware. Specifically, for example, a function module installed or integrated in a mobile device or a mobile device may perform the procedure shown in FIG. 3, and the mobile device configured to implement the procedure may have a sensor system and a positioning system.

As shown in FIG. 3, the procedure includes the following steps:

Step 301: The mobile device determines that the mobile device is in a preset state.

Step 302: The mobile device determines a position reference value of the mobile device based on preset map data and an estimated positioning value that is output by the positioning system.

Step 303: The mobile device corrects, based on the position reference value, the estimated positioning value output by the positioning system.

To describe the positioning solution provided in the embodiments of the present invention more clearly, the following describes in detail the positioning solution provided in the embodiments of the present invention with reference to a vehicle positioning scenario.

Specifically, when the positioning solution provided in the embodiments of the present invention is applied to the vehicle positioning scenario, a mobile device may be located in a vehicle (for example, a mobile phone or an in-vehicle mobile device that is fastened to the vehicle by using a holder). An estimated positioning value and an estimated speed value that are output by a positioning system included in the mobile device may also be considered as an estimated positioning value and an estimated speed value of the vehicle in which the mobile device is located. The positioning system includes but is not limited to a positioning system based on an inertial navigation technology, a positioning system based on a wireless positioning technology, a positioning system that integrates an inertial navigation technology and a wireless positioning technology, and the like. A sensor system included in the mobile device may include an accelerometer, a gyroscope, a magnetometer, and the like.

Specifically, the positioning system included in the mobile device may be a built-in positioning system of the mobile device. Alternatively, in some embodiments of the present invention, the positioning system may be a built-in positioning system that is of a vehicle and that can communicate with the mobile device, and the mobile device obtains, by communicating with the positioning system, an estimated positioning value and an estimated speed value that are uploaded by the positioning system.

Specifically, the sensor system included in the mobile device may be a built-in sensor system of the mobile device. A position of the mobile device is fixed relative to the vehicle, so that a position of a sensor is fixed relative to the vehicle. Alternatively, in some embodiments of the present invention, the sensor system may be a built-in sensor system of the vehicle, or the mobile device may further include a built-in sensor system of the vehicle. The mobile device may obtain, by communicating with the vehicle, measurement data uploaded by a built-in sensor of the vehicle.

The positioning solution provided in the embodiments of the present invention may be specifically implemented as software installed or integrated in the mobile device or a combination of software and hardware, that is installed or integrated in the mobile device. A speed reference value and a position reference value of the mobile device that are determined by using the positioning solution provided in the embodiments of the present invention may be considered as a speed reference value and a position reference value of the vehicle in which the mobile device is located.

Specifically, preset map data may be read from a feature database that includes positions having a natural feature such as a distribution position of a speed bump, a distribution position of a road turning point, a position of a cross-floor channel, and a connected floor. Data in the feature database may be manually recorded in advance and updated.

For ease of description, in this application, it is assumed that a position of a sensor is fixed relative to a vehicle, and a vehicle coordinate system is established. It should be understood that the foregoing assumption and the vehicle coordinate system are merely used to describe the technical solution provided in the embodiments of the present invention more clearly, and do not constitute a limitation on the present invention.

Figure 4:
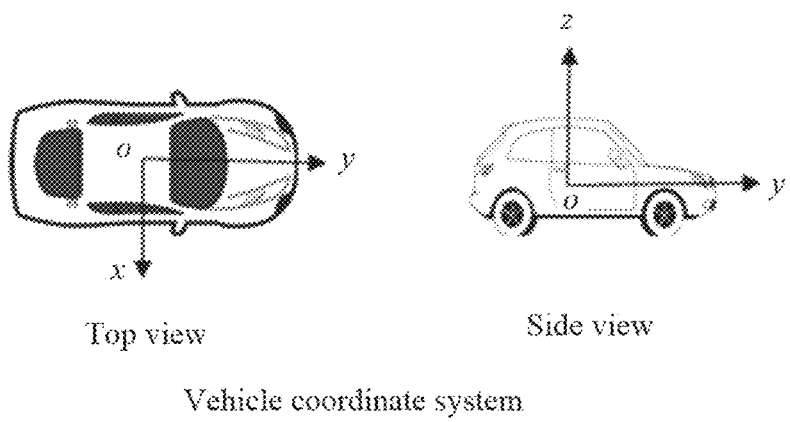
FIG. 4 (a) is a schematic top view of a vehicle coordinate system according to some embodiments of the present invention.

Generally, the vehicle coordinate system is defined as O-xyz. FIG. 4 (a) is a schematic top view of a vehicle coordinate system, and FIG. 4 (b) is a schematic side view of a vehicle coordinate system. As shown in FIG. 4 (a) and FIG. 4 (b), the vehicle coordinate system is a three-dimensional coordinate system that meets a right-hand rule. A z-axis is in a gravity direction, and an x-axis and a y-axis are respectively perpendicular to the z-axis.

It is assumed that a sensor coordinate system overlaps the vehicle coordinate system in terms of direction. For the sensor, such as an accelerometer and a gyroscope, the accelerometer may directly measure motion accelerations of the vehicle in directions of three axes of the x-axis, the y-axis, and the z-axis, and it is assumed that measurement output of the accelerometer on the three axes is marked as $[a_x, a_y, a_z]$; the gyroscope may directly measure rotation angular velocities at which the vehicle rotates around the three axes of the x-axis, the y-axis, and the z-axis, and measurement output of the gyroscope on the three axes is marked as $[w_x, w_y, w_z]$.

It is assumed that the sensor coordinate system does not overlap the vehicle coordinate system in terms of direction, and then a conversion relationship between the vehicle coordinate system and the sensor coordinate system may be determined by using the following method.

When the vehicle travels on a plane, a gravity direction measured by the accelerometer is determined as a z-axis direction of the vehicle. When the vehicle travels in a straight line, an acceleration of the vehicle changes on only the y-axis of the vehicle, and an attitude of the y-axis of the vehicle relative to the coordinate axis of the sensor may be obtained by determining a change direction of a measured acceleration value. Because the vehicle coordinate system O-xyz is a right-hand coordinate system, when attitudes of the y-axis and the z-axis of the vehicle relative to the sensor coordinate system are known, an attitude of the x-axis of the vehicle relative to the sensor coordinate system may be uniquely determined.

Therefore, the conversion relationship between the sensor coordinate system and the vehicle coordinate system is determined, so that measurement data obtained by the sensor may be represented in the vehicle coordinate system through conversion.

For ease of description, in the following description, it is assumed that the sensor coordinate system overlaps the vehicle coordinate system in terms of direction, and the following "an axis of the sensor" may be understood as any one of the x-axis, the y-axis, or the z-axis in the vehicle coordinate system O-xyz. It should be understood that the assumption herein also does not constitute a limitation on the present invention.

Specifically, states of the vehicle existed when the vehicle passes through some positions having a natural feature such as a speed bump, a turning point, and a cross-floor channel during traveling may be identified by using data detected by a sensor system, and a stop state of the vehicle may also be determined by using the data detected by the sensor system. Therefore, when the positioning solution provided in some embodiments of the present invention is applied to the vehicle positioning scenario, the preset state may specifically include the following: The vehicle in which the mobile device is located passes through a speed bump, the vehicle in which the mobile device is located passes through a road turning point, the vehicle in which the mobile device is located passes through a cross-floor channel, the vehicle in which the mobile device is located stops, or the like.

For the example cases of the preset state, the following describes in detail the processes that are described in the foregoing embodiments of the present invention, where the processes include: determining that the mobile device is in the preset state; and after determining that the mobile device is in the preset state, determining the speed reference value of the mobile device based on the data detected by the sensor system, and/or determining the position reference value of the mobile device based on the preset map data and the estimated positioning value that is output by the positioning system.

A. The preset state is that the vehicle in which the mobile device is located passes through a speed bump.

When the vehicle passes through a speed bump, the data detected by the sensor system suddenly changes in an oscillation manner, and when a front wheel and a rear wheel of the vehicle pass through the speed bump in a time sequence, the data suddenly changes once respectively in an oscillation manner. Therefore, in some embodiments of the present invention, based on a change feature, of detected data, existed when the vehicle passes through the speed bump, whether the vehicle is in a state that the vehicle passes through a speed bump may be determined by analyzing a change status of a signal that is detected on an axis by at least one sensor in the sensor system.

Specifically, for example, in some embodiments of the present invention, when determining that data that is detected by the at least one sensor in the sensor system suddenly changes twice in an oscillation manner in preset duration, the mobile device determines that the vehicle in which the mobile device is located passes through a speed bump.

Further, the sensor system may obtain, by processing a recorded data signal, relatively accurate times at which the front wheel and the rear wheel of the vehicle pass through the speed bump. In addition, a distance between the front wheel and the rear wheel of the vehicle is a fixed parameter that can be obtained in advance. Therefore, in some embodiments of the present invention, if the mobile device determines that the vehicle in which the mobile device is located passes through a speed bump, based on the times at which the front wheel and the rear wheel of the vehicle respectively pass through the speed bump and that are detected by the sensor system, a speed reference value existed when the vehicle passes through the speed bump may be further obtained by dividing a value of the distance between the front wheel and the rear wheel of the vehicle in which the mobile device is located by an absolute value of a time difference between the times at which the front wheel and the rear wheel of the vehicle pass through the speed bump, so as to correct the estimated speed value output by the positioning system.

Specifically, for example, it is assumed that T1 is used to represent a time at which the front wheel of the vehicle in which the mobile device is located passes through the speed bump, and T2 is used to represent a time at which the rear wheel of the vehicle in which the mobile device is located passes through the speed bump, d is used to represent the value of the distance between the front wheel and the rear wheel of the vehicle in which the mobile device is located, and $v_{ref}$ is used to represent the speed reference value existed when the vehicle passes through the speed bump. Then, $v_{ref}$ may be obtained through calculation by using the following formula:

$$v_{ref} = \frac{d}{T_2 - T_1}.$$

Figure 5:
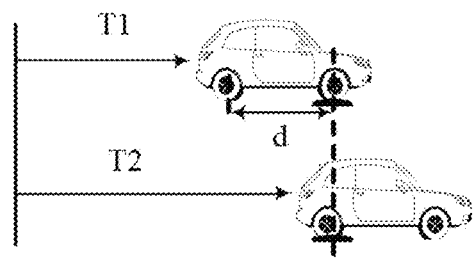
FIG. 5 (a) is a schematic diagram in which a front wheel and a rear wheel of a vehicle sequentially pass through a speed bump according to some embodiments of the present invention.
Figure 5:
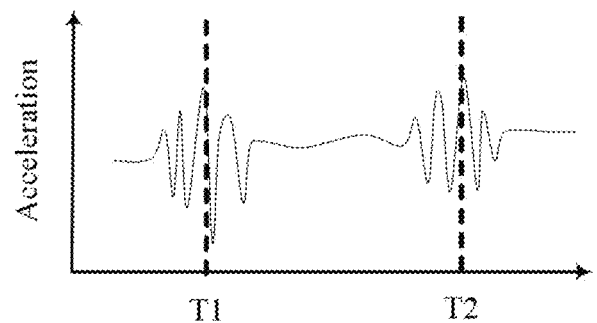

FIG. 5 (a) is a schematic diagram in which a front wheel and a rear wheel of a vehicle sequentially pass through a speed bump. The front wheel of the vehicle passes through the speed bump at a moment T1, and the rear wheel of the vehicle passes through the speed bump at a moment T2. FIG. 5 (b) is a schematic diagram of an acceleration signal that is detected by a sensor on an axis when a vehicle passes through a speed bump. It can be learned that when the front wheel and the rear wheel of the vehicle pass through the speed bump, the acceleration signal suddenly changes once respectively in an oscillation manner.

Specifically, considering that when the vehicle passes through the speed bump, data detected by sensors suddenly changes in an oscillation manner at a same time, in examples of an accelerometer and a gyroscope, sampling data, on any axis, of the accelerometer and the gyroscope can be used to calculate a speed reference of the vehicle. In some embodiments of the present invention, data on one or more axes may be selected to calculate the speed reference value of the vehicle, and calculated speed reference values are finally averaged, and an average value is used as a final calculation result of the speed reference value.

Further, when the vehicle passes through a speed bump, an instantaneous position of the vehicle is a position of the current speed bump, but position distribution of the speed bump is geographically deterministic. Therefore, in some embodiments of the present invention, if the mobile device determines that the vehicle in which the mobile device is located passes through a speed bump, the mobile device may further find, based on position distribution of a speed bump in the preset map data, a position of a speed bump closest to the estimated positioning value output by the positioning system, and determine the position of the found speed bump as the position reference value, so as to correct the estimated positioning value output by the positioning system.

Specifically, for example, the preset map data is a feature database that includes position distribution of a speed bump. In some embodiments of the present invention, if the mobile device determines that the vehicle in which the mobile device is located passes through a speed bump, the mobile device may match the current estimated positioning value output by the positioning system and data in the feature database, to determine an actual position of a speed bump on which the vehicle currently impacts, and further use the actual position as the position reference value.

It can be learned from the foregoing descriptions that because a position of a speed bump is deterministic, a speed at which the vehicle passes through the speed bump may be obtained through calculation based on the data detected by the sensor. Therefore, when it is determined that the vehicle in which the mobile device is located passes through a speed bump, the speed reference value can be further provided for the vehicle based on the data detected by the sensor system, and the position reference value can be provided for the vehicle based on the preset map data and the estimated positioning value, so as to provide reference data for subsequent correction of the estimated speed and the positioning estimation that are output by the positioning system.

In an example, the following is a process in which the mobile device determines, based on data detected by an accelerometer on a z-axis, that a vehicle passes through a speed bump, and determines a speed reference value and a position reference value of the vehicle.

Step A01: Determine whether a sampling amplitude value $a_z$ of the accelerometer exceeds a specified threshold $\bar{\alpha}$; and if $a_z$ exceeds $\bar{\alpha}$, consider that a speed bump impact event occurs at a current moment, and record the current moment as $t_0$.

Step A02: Specify a time window $[t_0, t_0+T_b]$, where $T_b$ is a length of the time window; and record all moments at which $a_z$ exceeds the threshold a and that are in the time window. It is assumed there are N+1 moments at which an acceleration value exceeds the threshold, and the N+1 moments constitute a set $S=\{t_0, t_1, \ldots, t_N\}$.

Step A03: Calculate a difference between two adjacent moments according to a formula $\Delta t_i = t_i - t_{i-1}, i=\{1, 2, \ldots, N\}$; and calculate a maximum moment difference according to a formula $\Delta t_{max} = \max\{\Delta t_1, \Delta t_2, \ldots, \Delta t_N\}$.

Step A04: If the maximum moment difference $\Delta t_{max}$ is greater than a specified time threshold $\Delta \bar{t}$, classify the set S is into $S_1=\{t_0, t_1, \ldots, t_k\}$ and $S_2=(t_{k1}, t_{k+2}, \ldots, t_N)$, where $t_k$ meets $\Delta t_{max} = t_{k+1} - t_k$.

Step A05: Respectively calculate average values of S and $S_2$ according to formulas:

$$T_1 = \frac{t_0 + t_1 + \ldots + t_k}{k+1} \text{ and } T_2 = \frac{t_{k+1} + t_{k+2} + \ldots + t_N}{N-k}.$$

Step A06: If it is known that an axle distance between a front wheel and a rear wheel of the vehicle is d, calculate the speed reference value of the vehicle according to a formula:

$$v_{ref} = \frac{d}{T_2 - T_1}.$$

Step A07: Determine, by matching a current estimated positioning value of the vehicle and the data in the feature database, a position of a speed bump closest to the current estimated positioning value of the vehicle, where the position of the speed bump is used as a position reference value $x_{ref}$ of the vehicle.

B. The preset state is that the vehicle in which the mobile device is located passes through a road turning point.

Figure 6:
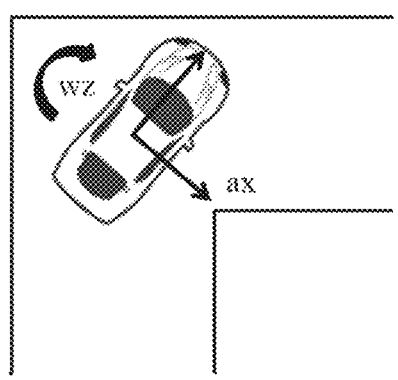
FIG. 6 (a) is a schematic diagram in which a vehicle passes through a road turning point according to some embodiments of the present invention.
Figure 6:
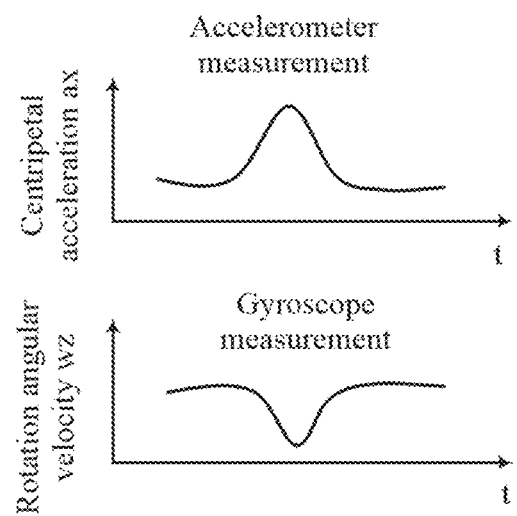

When the vehicle passes through a road turning point, both a centripetal acceleration and a rotation angular velocity of the vehicle suddenly change. For example, FIG. 6 (a) is a schematic diagram in which a vehicle passes through a road turning point, and FIG. 6 (b) is a schematic diagram of data measured by an accelerometer and data measured by a gyroscope when a vehicle passes through a road turning point.

It can be learned that when the vehicle passes through the road turning point, a centripetal acceleration $a_x$ that is of the vehicle on an x-axis of a coordinate system and that is measured by the accelerometer and a rotation angular velocity $w_z$ at which the vehicle rotates around a z-axis of the coordinate system and that is measured by the gyroscope both suddenly change once. Therefore, in some embodiments of the present invention, when determining that an absolute value of a rotation angular velocity detected by the sensor system is greater than a rotation angular velocity threshold, or determining that an absolute value of a centripetal acceleration detected by the sensor system is greater than a centripetal acceleration threshold, the mobile device determines that the vehicle in which the mobile device is located passes through a road turning point.

Further, in some embodiments of the present invention, if the mobile device determines that the vehicle in which the mobile device is located passes through a road turning point, based on a centripetal acceleration value and a rotation angular velocity value that are detected by the sensor system, a speed reference value existed when the vehicle passes through the road turning point may be further obtained by dividing the centripetal acceleration value by the rotation angular velocity value, so as to correct the estimated speed value output by the positioning system.

Specifically, for example, it is assumed that $a_x$ is used to represent the centripetal acceleration that is of the vehicle on the x-axis of the coordinate system and that is measured by the accelerometer, $w_z$ is used to represent the rotation angular velocity at which the vehicle rotates around the z-axis of the coordinate system and that is measured by the gyroscope, and $v_{ref}$ is used to represent the speed reference value existed when the vehicle passes through the road turning point. Then, $v_{ref}$ may be obtained through calculation by using the following formula:

$$v_{ref} = \frac{a_x}{w_z}.$$

Similarly, when the vehicle passes through a road turning point, an instantaneous position of the vehicle is a position of the current road turning point, but position distribution of the road turning point is geographically deterministic. Therefore, in some embodiments of the present invention, if it is determined that the vehicle in which the mobile device is located passes through a road turning point, the mobile device may further find, based on position distribution of a road turning point in the preset map data, a position of a road turning point closest to the estimated positioning value output by the positioning system, and determine the position of the found road turning point as the position reference value, so as to correct the estimated positioning value output by the positioning system.

Specifically, for example, the preset map data is a feature database that includes position distribution of a road turning point. In some embodiments of the present invention, if the mobile device determines that the vehicle in which the mobile device is located passes through a road turning point, the mobile device may match the current estimated positioning value output by the positioning system and data in the feature database, to determine an actual position of a road turning point through which the vehicle currently passes, and use the actual position as the position reference value.

It can be learned from the foregoing descriptions that because a position of a road turning point is deterministic, a speed at which the vehicle passes through the road turning point may be obtained through calculation based on the data detected by the sensor. Therefore, when determining that the vehicle in which the mobile device is located passes through a road turning point, the mobile device can further provide the speed reference value for the vehicle based on the data detected by the sensor system, and can provide the position reference value for the vehicle based on the preset map data and the estimated positioning value, so as to provide reference data for subsequent correction of the estimated speed and the positioning estimation that are output by the positioning system.

In an example, the following is a process in which the mobile device determines, based on data detected by a gyroscope on a z-axis, that a vehicle passes through a road turning point, and further determines a speed reference value and a position reference value of the vehicle.

Step B01: Determine whether an absolute value of a component $w_z$ of the gyroscope on the z-axis is greater than a specified threshold $\overline{w}_z$; and if $w_z$ is greater than $\overline{w}_z$, consider that the vehicle turns a corner, that is, the vehicle passes through a road turning point.

Step B02: Calculate a speed reference value existed when the vehicle passes through the road turning point according to a formula $$v_{ref} = \frac{a_x}{w_z}.$$

Step B03: Obtain, by matching current positioning estimation of the vehicle and a turning point in the feature database, a road turning point closest to the current estimated positioning value of the vehicle, where the position of the road turning point is used as a current position reference value $x_{ref}$ of the vehicle.

C. The preset state is that the vehicle in which the mobile device is located passes through a cross-floor channel.

Figure 7:
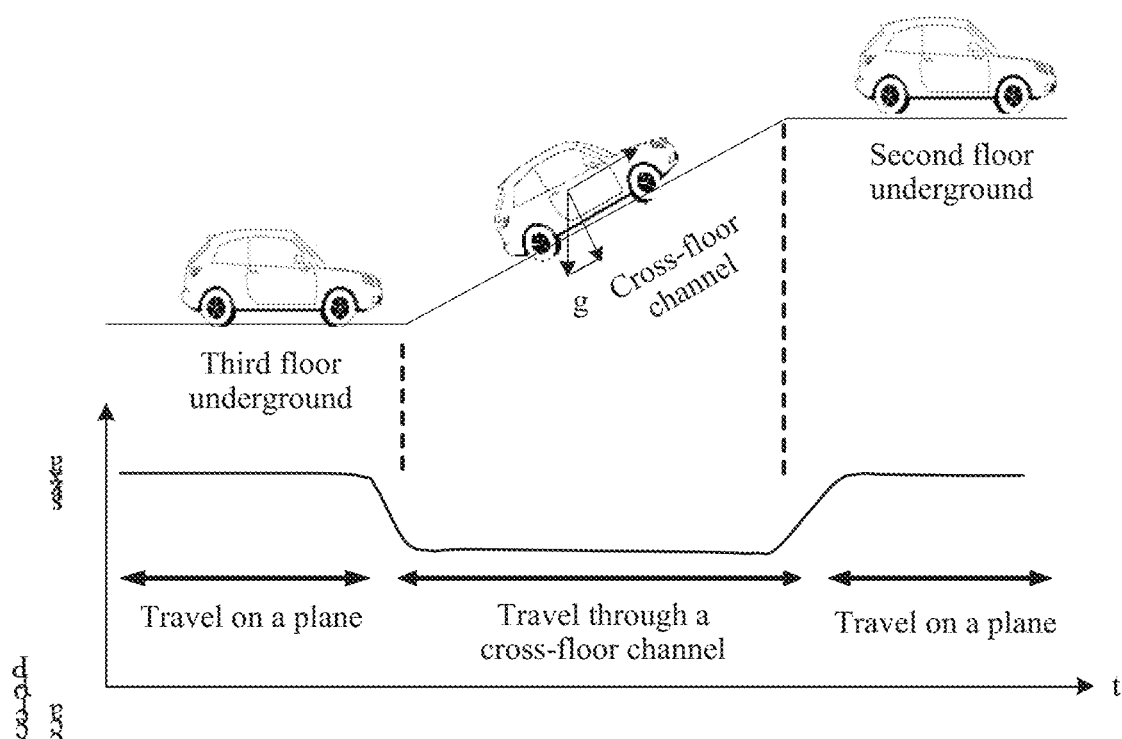
FIG. 7 is a schematic diagram in which a vehicle passes through a cross-floor channel according to some embodiments of the present invention.

After the vehicle travels into a cross-floor channel from a plane floor, a projection component of gravity in a z-axis direction of a vehicle coordinate system becomes smaller. For example, FIG. 7 is a schematic diagram in which a vehicle passes through a cross-floor channel. It can be learned that when the vehicle passes through the cross-floor channel, an acceleration component $a_z$ that is of the vehicle on a z-axis of the coordinate system and that is measured by an accelerometer becomes smaller. Therefore, in some embodiments of the present invention, the mobile device may determine, by detecting a change of a projection component that is on the z-axis and that is of an acceleration detected by the accelerometer, whether the vehicle travels into a cross-floor channel.

Specifically, for example, in some embodiments of the present invention, when determining that an absolute value of a component that is in a direction perpendicular to a vehicle chassis and that is of an acceleration value detected by the sensor system is less than an acceleration threshold, the mobile device determines that the vehicle in which the mobile device is located passes through a cross-floor channel.

Further, in some embodiments of the present invention, when determining that an average value of components that are on a y-axis of the coordinate system and that are of acceleration values detected by the sensor system is less than zero in specified duration, the mobile device determines that the vehicle in which the mobile device is located travels to a lower floor. Alternatively, when determining that an average value of components that are on a y-axis of the coordinate system and that are of acceleration values detected by the sensor system is greater than zero in specified duration, the mobile device determines that the vehicle in which the mobile device is located travels to an upper floor.

Specifically, the cross-floor channel may include a slope, a spiral lane, and the like. This is not limited in the present invention.

Further, in some embodiments of the present invention, if the mobile device determines that the vehicle in which the mobile device is located passes through a cross-floor channel, based on a start time and an end time at which the vehicle passes through the cross-floor channel and that are detected by the sensor system, a speed reference value existed when the vehicle passes through the cross-floor channel may be further obtained by dividing a length value of the cross-floor channel by an absolute value of a time difference between the start time and the end time at which the vehicle in which the mobile device is located passes through the cross-floor channel, so as to correct the estimated speed value output by the positioning system.

Similarly, when the vehicle passes through a cross-floor channel, an instantaneous position of the vehicle is a position of the current cross-floor channel, but position distribution of the cross-floor channel is geographically deterministic. Therefore, in some embodiments of the present invention, if the mobile device determines that the vehicle in which the mobile device is located passes through a cross-floor channel, the mobile device may further find, based on position distribution of a cross-floor channel in the preset map data, a position of a cross-floor channel closest to the estimated positioning value output by the positioning system, and determine the position of the found cross-floor channel as the position reference value, so as to correct the estimated positioning value output by the positioning system.

Specifically, for example, the preset map data is a feature database that includes position distribution of a cross-floor channel. In some embodiments of the present invention, if the mobile device determines that the vehicle in which the mobile device is located passes through a cross-floor channel, the mobile device may match the current estimated positioning value output by the positioning system and data in the feature database, to determine an actual position of a cross-floor channel through which the vehicle currently passes, and use the actual position as the position reference value.

It can be learned from the foregoing descriptions that because a position of a cross-floor channel is deterministic, a speed at which the vehicle passes through the cross-floor channel may be calculated. Therefore, when determining that the vehicle in which the mobile device is located passes through a cross-floor channel, the mobile device can further provide the speed reference value for the vehicle based on the data detected by the sensor system, and can provide the position reference value for the vehicle based on the preset map data and the estimated positioning value, so as to provide reference data for subsequent correction of the estimated speed and the positioning estimation that are output by the positioning system. In addition, acceleration directions on the y-axis are different when the vehicle travels to an upper floor and a lower floor through a cross-floor channel. Therefore, determining that the vehicle passes through a cross-floor channel, the mobile device can further determine a floor switching status of the vehicle.

In an example, the following is a process in which the mobile device determines, based on data detected by an accelerometer on a z-axis, that a vehicle passes through a cross-floor channel, and further determines a position reference value of the vehicle based on data detected by the accelerometer on a y-axis.

Step C01: Determine sampling data $a_z$ of the acceleration on the z-axis; and if an absolute value of $a_z$ is less than a specified threshold $\overline{\alpha}_z$, and exceeds specified duration $T_{f1}$, consider that the vehicle enters a cross-floor channel.

Step C02: After it is determined that the vehicle enters the cross-floor channel, calculate an average value of $a_y$ in a time period whose time window length is $T_1$; and if the average value of $a_y$ is greater than 0, the vehicle travels to an upper floor; or if the average value of $a_y$ is less than 0, the vehicle travels to a lower floor.

Step C03: Obtain, by matching current positioning estimation of the vehicle and the data in the feature database, a position of a cross-floor channel closest to the current estimated positioning value of the vehicle, where the position of the cross-floor channel is used as a position reference value $x_{ref}$ of the vehicle.

Step C04: If a value of $a_z$ is greater than $\overline{\alpha}_z$, and exceeds specified duration $T_{f2}$, consider that the vehicle has travelled to a new floor. In this case, an exit of the cross-floor channel is the current position reference $x_{ref}$ of the vehicle.

D. The preset state is that the vehicle in which the mobile device is located stops.

Figure 8:
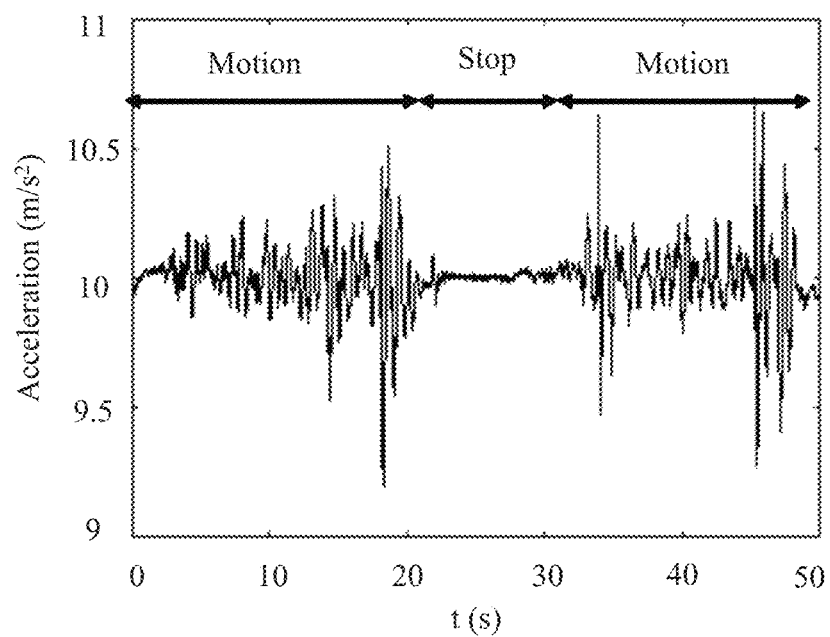
FIG. 8 is a schematic diagram of data measured by an accelerometer when a vehicle stops according to some embodiments of the present invention.

After the vehicle stops, an amplitude of data measured by each sensor is less than an amplitude of the vehicle in a motion state. For example, FIG. 8 is a schematic diagram of data measured by an accelerometer when a vehicle stops. It can be learned that when the vehicle stops, an amplitude of an acceleration measured by the accelerometer is less than the amplitude in the motion state. Therefore, in some embodiments of the present invention, the mobile device may determine, by calculating whether a variance (which may alternatively be another data statistical feature, such as a difference between a maximum value and a minimum value) of sensor data (data of at least one sensor on at least one axis) is less than a preset threshold, whether the vehicle currently stops.

In some embodiments of the present invention, when determining that a variance of a plurality of pieces of consecutive data in at least one spatial dimension that are detected by the sensor system is less than the threshold, the mobile device determines that the vehicle in which the mobile device is located stops. Specifically, for example, data measured on any axis by the accelerometer and the gyroscope can be used for detecting and determining a vehicle stop.

Further, considering that when the vehicle stops, a speed feature is that a speed is zero, a speed reference value may be provided for the vehicle when the vehicle stops. In some embodiments of the present invention, if the mobile device determines that the vehicle in which the mobile device is located stops, for example, determines that the variance of the plurality of pieces of consecutive data in the at least one spatial dimension that are detected by the sensor system is less than the threshold, the mobile device may further determine that the speed reference value of the mobile device is zero, so as to use the speed reference value to correct the estimated speed value output by the positioning system.

It can be learned from the foregoing descriptions that because the speed is special when the vehicle stops, when determining that the vehicle in which the mobile device is located stops, the mobile device can provide the speed reference value for the vehicle, so as to provide reference data for subsequent correction of the estimated speed value output by the positioning system.

In an example, the following is a process in which the mobile device determines, based on data detected by an accelerometer on a z-axis, that a vehicle stops. A current moment is t, a length of a time window is set to $T_s$, and a variance value $\delta_z$ of sampling data $a_z$ of the sensor in the time window $[t-T_s, t]$ is calculated. If $\delta_z$ is less than a specified variance value $\overline{\delta}_z$, it may be considered that the vehicle in which the mobile device is located stops, and a speed reference value of the vehicle is $v_{ref}=0$.

It should be noted that for another possible case of the preset state, for example, the vehicle in which the mobile device is located passes through another similar position in a traveling environment, where the position has the following features: the position can be determined, a speed at which the vehicle passes through the position can be calculated or determined, based on the technical solution provided in this application, persons skilled in the art can easily figure out a corresponding processing process of determining a speed reference value and a position reference value.

Further, in some embodiments of the present invention, after obtaining the speed reference value and/or the position reference value of the mobile device in the preset state by using the foregoing process, the mobile device may further correct the estimated speed value and/or the estimated positioning value that are/is output by the positioning system.

Figure 9:
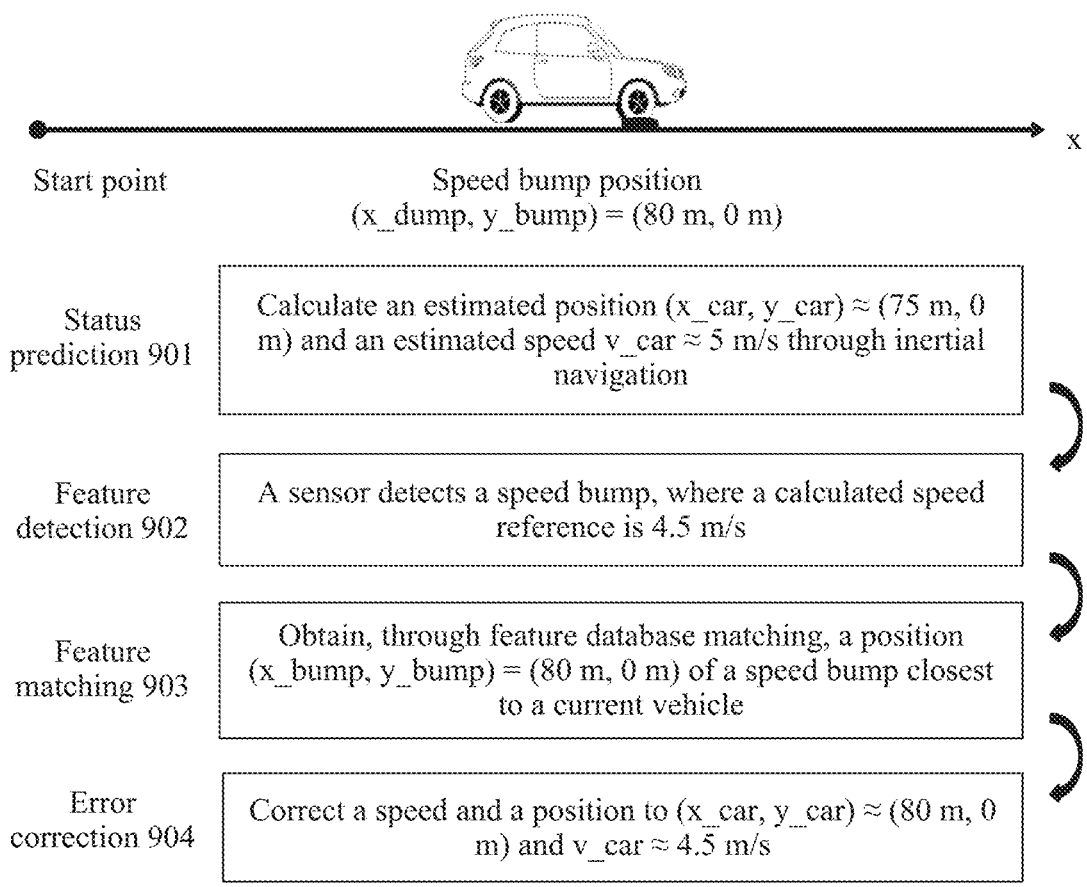
FIG. 9 is a schematic flowchart in which a mobile device corrects an estimated speed and positioning estimation when a vehicle passes through a speed bump in actual application according to some embodiments of the present invention.

Specifically, for example, the mobile device determines that the vehicle in which the mobile device is located passes through a speed bump. It can be learned from the foregoing descriptions that when determining that the vehicle in which the mobile device is located passes through a speed bump, the mobile device can further provide the speed reference value for the vehicle based on the data detected by the sensor system, and can provide the position reference value for the vehicle based on the preset map data and the estimated positioning value, so as to correct the estimated speed and the positioning estimation that are output by the positioning system. FIG. 9 is a schematic flowchart in which a mobile device corrects an estimated speed and positioning estimation in actual application according to some embodiments of the present invention.

As shown in FIG. 9, the procedure includes a status prediction phase 901, a feature detection phase 902, a feature matching phase 903, and an error correction phase 904. In the status prediction phase 901, an estimated position (it is assumed that (x-car, y-car)≈(75 m, 0 m)) and an estimated speed (it is assumed that v-car≈5 m/s) of a vehicle are calculated through inertial navigation. In this case, the mobile device detects, by using a sensor system, that the vehicle passes through a speed bump (assuming that an actual geographical position is (x-bump, y-bump)=(80 m, 0 m)). Therefore, the mobile device may calculate, by using data detected by a sensor, a speed reference value (it is assumed that the speed reference value is 4.5 m/s) existed when the vehicle passes through the speed bump, and also obtain an actual position of the current speed bump by matching a current estimated positioning value of the vehicle and a feature database, so that by using a speed bump event, the mobile device corrects the estimated positioning value of the vehicle to (x-car, y-car)≈(80 m, 0 m), and corrects the estimated speed value of the vehicle to v-car≈4.5 m/s.

Figure 10:
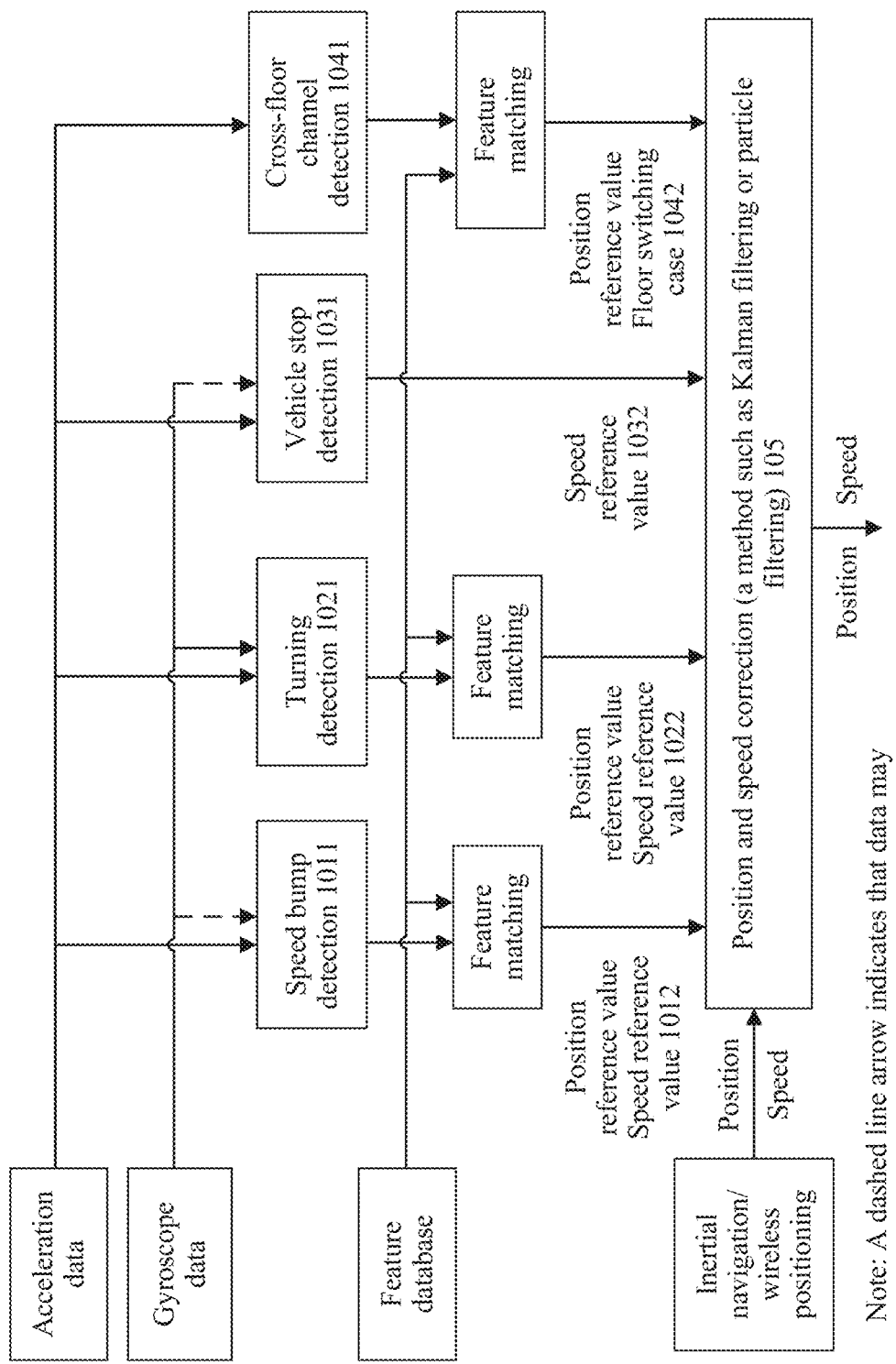
FIG. 10 is a schematic flowchart of determining a vehicle status based on sensor data and feature database data and correcting an estimated speed value and an estimated positioning value in application according to some embodiments of the present invention.

FIG. 10 is a schematic flowchart in which a mobile device determines a vehicle status based on sensor data and feature database data and corrects an estimated speed value and an estimated positioning value in application according to some embodiments of the present invention.

As shown in FIG. 10, the mobile device can obtain acceleration data, gyroscope data, and feature database data that is preset in a system, and the mobile device then can perform speed bump detection 1011, turning detection 1021, vehicle stop detection 1031, and cross-floor channel detection 1041 based on the data (a dashed line in FIG. 10 represents that data is optional data and is not necessarily used data).

Specifically, the mobile device may simultaneously perform the speed bump detection 1011, the turning detection 1021, the vehicle stop detection 1031, and the cross-floor channel detection 1041 based on the sensor data.

Based on a result obtained through the foregoing detection, for the speed bump detection 1011, the mobile device can obtain a position reference value and a speed reference value 1012 through feature matching; for the turning detection 1021, the mobile device can obtain a position reference value and a speed reference value 1022 through feature matching; for the vehicle stop detection 1031, the mobile device can obtain a speed reference value 1032: and for the cross-floor channel detection 1041, the mobile device can obtain a position reference value and a floor switching status 1042 through feature matching.

Further, by using the foregoing obtained data, the mobile device can perform correction 105 on an estimated positioning value and an estimated speed value that are output by a positioning system that uses an inertial navigation technology and/or a wireless positioning technology. Specifically, for example, an estimated positioning value and an estimated speed value of the vehicle may be updated by using a Kalman filtering method, particle filtering method, or the like by using the position reference value and/or the speed reference that are/is obtained through natural feature detection and calculation as an observation value/observation values.

Figure 11:
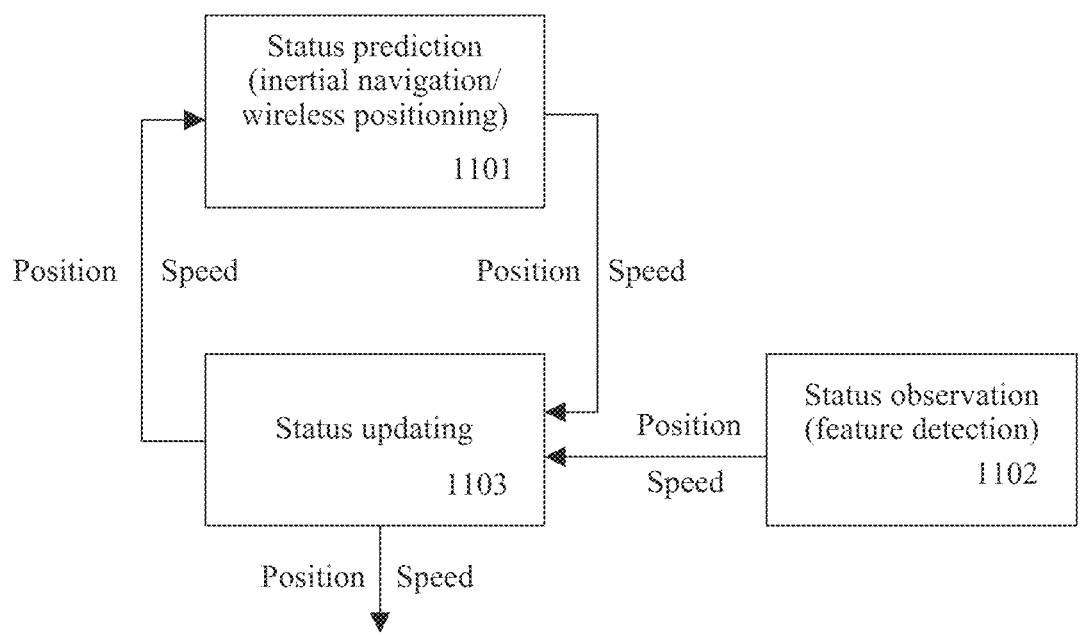
FIG. 11 is a schematic flowchart of correcting an estimated positioning value and an estimated speed value of a vehicle by using a Kalman filtering method according to some embodiments of the present invention.

Specifically, for example, FIG. 11 is a schematic flowchart of correcting an estimated positioning value and an estimated speed value of a vehicle by using a Kalman filtering method according to some embodiments of the present invention. The Kalman filtering method is a well-known technology in the art, and has a running mechanism of status prediction-status updating.

As shown in FIG. 11, a mobile device uses an estimated positioning value and an estimated speed value that are output by a positioning system (for example, an inertial navigation module and a wireless positioning module) as status prediction for the vehicle. The status prediction is corresponding to a covariance matrix, and the covariance matrix is used as a trust level of the status prediction (1101).

Further, the mobile device may use a position reference value and a speed reference value that are obtained through natural feature detection as status observation for Kalman filtering. The status observation is corresponding to a covariance matrix, and the covariance matrix is used as a trust level of the status observation (1102).

The mobile device compares the status observation and the status prediction, and a status update module obtains new status estimation (status updating 1103) based on the covariance matrices respectively corresponding to the status prediction and the status observation.

Therefore, the mobile device may output the new status estimation, and may also input the new status estimation to the positioning system (for example, the inertial navigation module and/or the wireless positioning module) as a basis for next status prediction.

Figure 12:
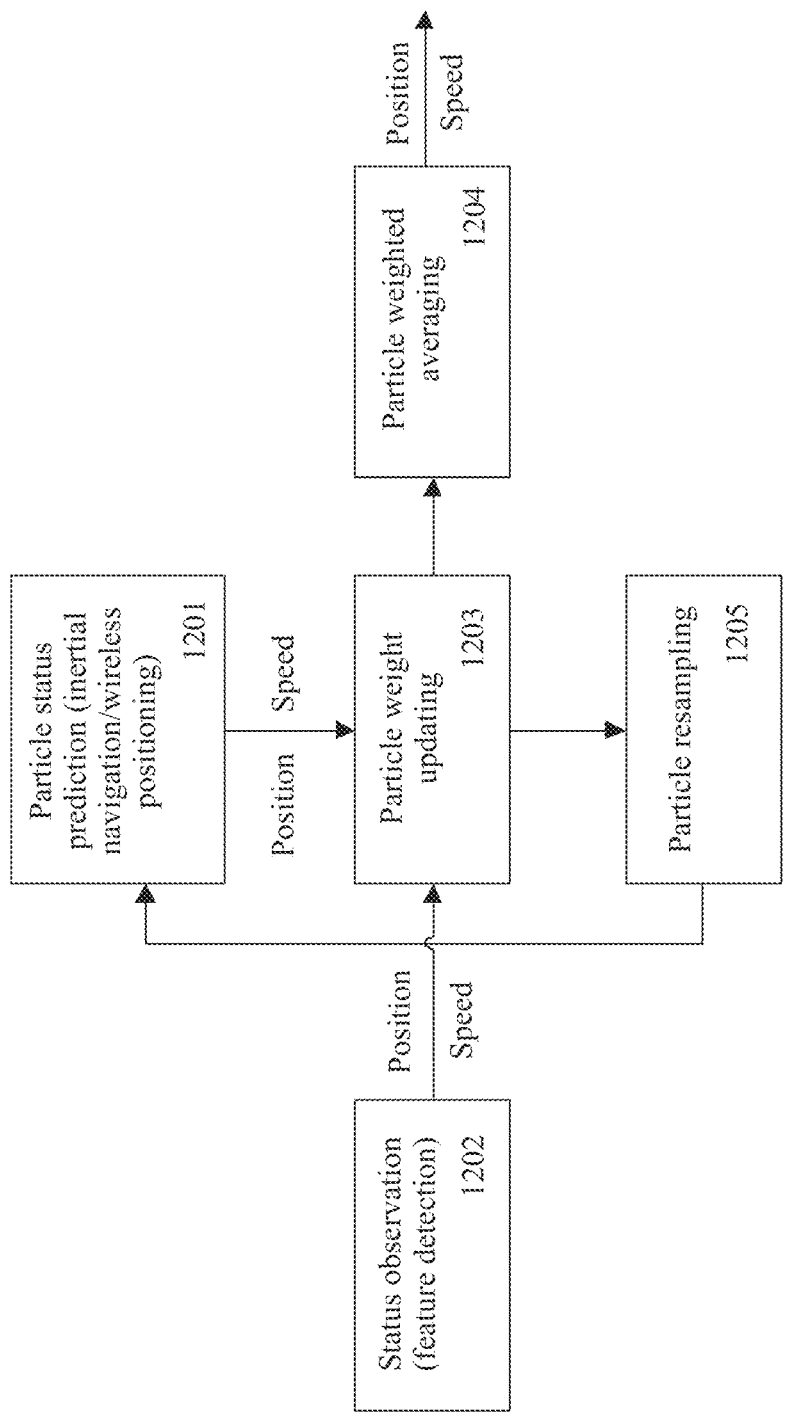
FIG. 12 is a schematic flowchart of correcting an estimated positioning value and an estimated speed value of a vehicle by using a particle filtering method according to some embodiments of the present invention.

Specifically, for another example, FIG. 12 is a schematic flowchart in which a mobile device corrects an estimated positioning value and an estimated speed value of a vehicle by using a particle filtering method according to some embodiments of the present invention. The particle filtering method is a well-known technology in the art, and has a running mechanism of status prediction-updating-resampling.

As shown in FIG. 12, the mobile device uses an estimated positioning value and an estimated speed value that are output by a positioning system (for example, an inertial navigation module and/or a wireless positioning module) as particle status prediction (1201) for the vehicle. In the particle filtering method, a real value of a vehicle status (a position and a speed) is unsure. A plurality of particles (each particle represents a possible state of the vehicle) are used to estimate the vehicle status. Each particle is corresponding to a weight, and the weight is used as a trust level of the particle. The mobile device may recalculate a weight of each particle (particle weight updating 1203) by using a position reference value and a speed reference value that are obtained through natural feature detection (status observation 1202). After weighted averaging is performed on all the particles (particle weighted averaging 1204), corrected current status estimation of the vehicle is obtained, and the status estimation is output. In addition, the mobile device may resample a particle based on an updated particle weight, so that distribution of a resampled particle set is consistent with a particle weight, and the resampled particle is used as a basis of the positioning system for performing next status prediction (particle resampling 1025).

It can be learned from the foregoing descriptions that according to the positioning solution provided in the embodiments of the present invention, the mobile device can detect, by using the sensor system (for example, an accelerometer and a gyroscope), whether the vehicle passes through a position (for example, a speed bump, a turning point, or a cross-floor channel) having a natural feature in an environment, whether the vehicle stops, or the like, and then obtain the position reference value and/or the speed reference value of the vehicle, so as to correct, by using the position reference value and/or the speed reference value, the estimated positioning value and the estimated speed value of the vehicle that are output by the positioning system, thereby improving vehicle positioning precision.

Further, according to the positioning solution provided in the embodiments of the present invention, the estimated positioning value and the estimated speed value of the vehicle can be corrected by using the position reference value and/or the speed reference value. Considering that the positioning system such as a positioning system that uses the inertial navigation technology may perform positioning estimation based on data detected by each sensor in the sensor system, and the data detected by the sensor has a disadvantage of error accumulation, in some embodiments of the present invention, when correcting, by using the speed reference value and/or the position reference value, the estimated positioning value and the estimated speed value that are output by the positioning system, the mobile device may further perform bias compensation on the sensor system based on at least one of the speed reference value or the position reference value. Position error accumulation existed in inertial navigation is eliminated by compensating for a sensor bias, so as to further improve positioning precision.

Specifically, the positioning solution provided in the embodiments of the present invention may be applied to indoor vehicle positioning, and may be combined with an existing technology and an existing system, such as indoor garage navigation and an empty parking space management system, to provide a complete indoor parking lot management service.

By using the positioning solution provided in the embodiments of the present invention, a position of a vehicle can be determined in real time. Therefore, in actual application of the positioning solution provided in the embodiments of the present invention, the mobile device can plan a traveling route of the vehicle in real time based on a navigation destination (or a parking space allocated by the empty parking space management system or the like) and a current position of the vehicle that are entered by a user, to guide the vehicle to the expected destination. When the vehicle deviates from a specified navigation route, the mobile device replans a route based on a real-time position of the vehicle. After the vehicle stops, the mobile device may send a current position of the vehicle to the empty parking space management system, and the empty parking space management system correspondingly sets, to "occupied", a parking space status corresponding to the current position of the vehicle, and updates empty parking space information in real time.

Figure 13:
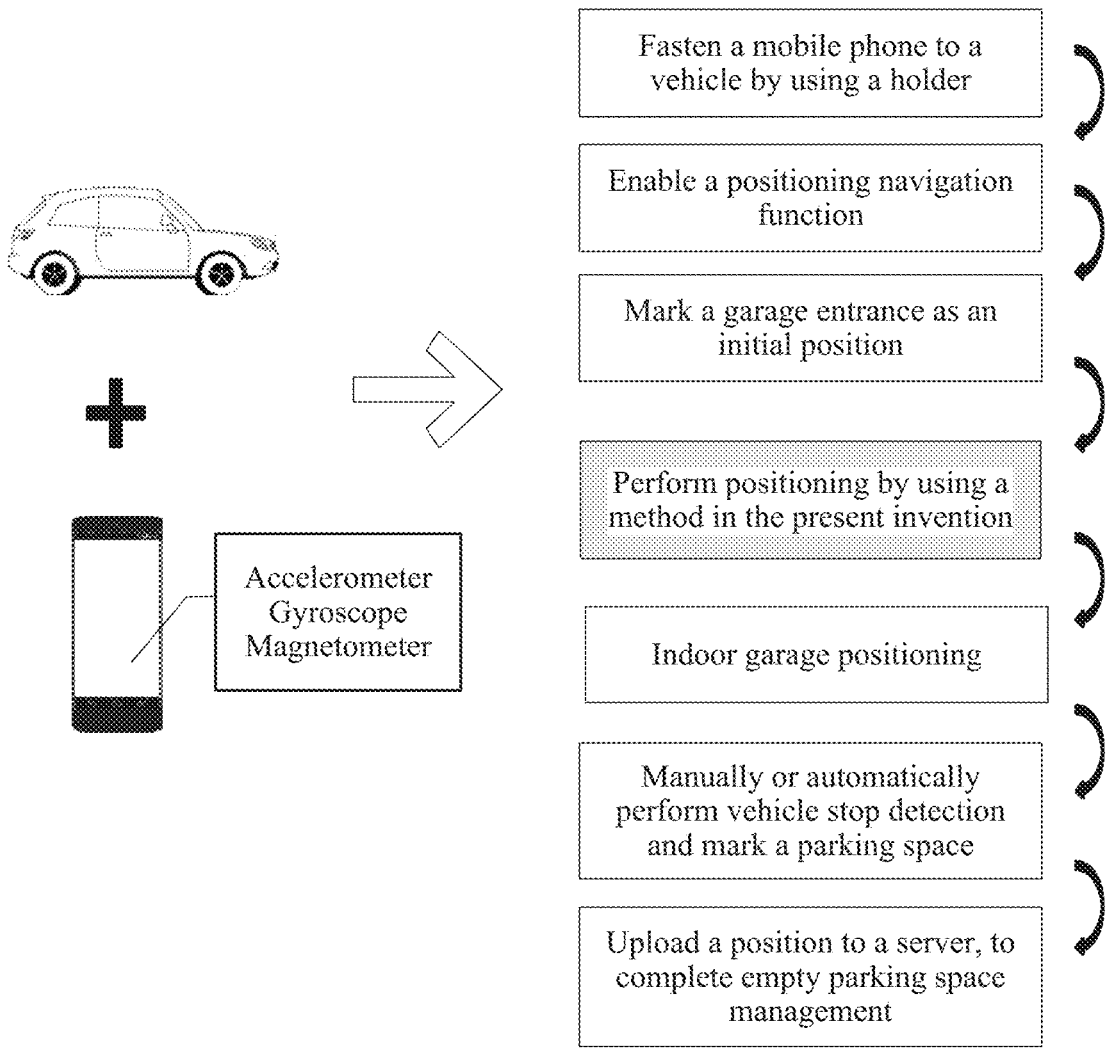
FIG. 13 is a schematic flowchart in which a positioning solution provided in some embodiments of the present invention is applied to indoor vehicle positioning.

For example, FIG. 13 is a schematic flowchart in which a positioning solution provided in some embodiments of the present invention is applied to indoor vehicle positioning. As shown in FIG. 13, a mobile device may be a mobile phone, and detection is performed by using an accelerometer, a gyroscope, and a magnetometer in the mobile phone. The mobile phone is fastened to a vehicle, and a positioning navigation function is enabled; a garage entrance is marked as an initial position; the positioning solution provided in the embodiments of the present invention is enabled to perform positioning; indoor garage navigation is enabled; vehicle stop detection and parking space marking are manually or automatically performed; and finally, a parking position is uploaded to a server, to complete empty parking space management.

Figure 14:
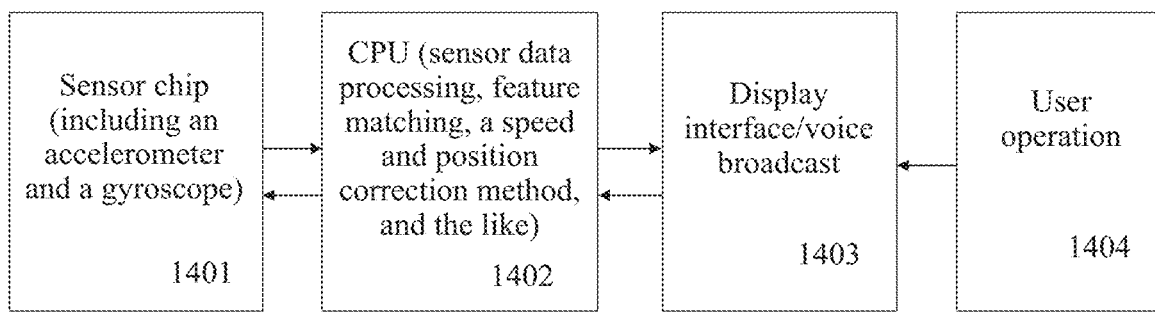
FIG. 14 is a schematic structural diagram of a mobile device to which a positioning solution provided in some embodiments of the present invention is applied.

Specifically, for example, FIG. 14 is a schematic structural diagram of a mobile device to which a positioning solution provided in some embodiments of the present invention is applied. As shown in FIG. 14, a mobile device 1400 includes a sensor chip 1401, a processor 1402, and a user display interface 1403.

The sensor chip 1401 may specifically include an accelerometer, a gyroscope, a magnetometer, and the like. The accelerometer and the gyroscope may be configured to detect a natural feature. In addition, the acceleration, the gyroscope, and the magnetometer may be configured to perform dead reckoning for a vehicle.

The processor 1402 sends a collection instruction and a sampling frequency of a sensor to the sensor chip 1401, and the sensor chip 1401 responds to the instruction sent by the processor 1402, and returns a sampling value to the processor 1402. The processor 1402 runs the positioning solution provided in some embodiments of the present invention to process sensor data, and sends a result to the user display interface 1403.

A user may send a user operation instruction to the processor 1402 by performing an operation 1404 (for example, a navigation destination) on the user display interface. After receiving the user operation instruction, the processor 1402 uses the user operation instruction as an input parameter of a positioning navigation system.

It can be learned from the foregoing descriptions that according to the positioning solution provided in the embodiments of the present invention, the mobile device can detect, by using a sensor system (for example, an accelerometer and a gyroscope), whether a vehicle passes through a position (for example, a speed bump, a turning point, or a cross-floor channel) having a natural feature in an environment, whether a vehicle stops, or the like, and then obtain a position reference value and/or a speed reference value of the vehicle, so as to correct an estimated positioning value and an estimated speed value of the vehicle by using the position reference value and/or the speed reference value, thereby improving vehicle positioning precision. The estimated position and the estimated speed of the vehicle may be obtained through dead reckoning, radio signal positioning, or integrated positioning.

Specifically, the positioning solution provided in the embodiments of the present invention may be combined with an existing positioning system, to correct positioning estimation performed by the existing positioning system, and improve positioning precision. Therefore, for a current positioning system based on an inertial navigation technology, a current positioning system based on a wireless positioning technology, and a current positioning system that integrates the inertial navigation technology and the wireless positioning technology, the following describes in detail implementation of a combination of the positioning solution provided in the embodiments of the present invention and the existing positioning system, and a technical effect that can be achieved.

A. A combination of the positioning solution provided in the embodiments of the present invention and the inertial navigation positioning technology.

The positioning solution provided in the embodiments of the present invention and the inertial navigation positioning technology are combined, so that a position having a natural feature in an environment can be detected by using a sensor, to obtain a position reference value and a speed reference value of a vehicle, so as to correct an estimated positioning value and an estimated speed value of the vehicle that are output through inertial navigation positioning, compensate for a sensor bias, and eliminate position error accumulation existing in inertial navigation.

Figure 15:
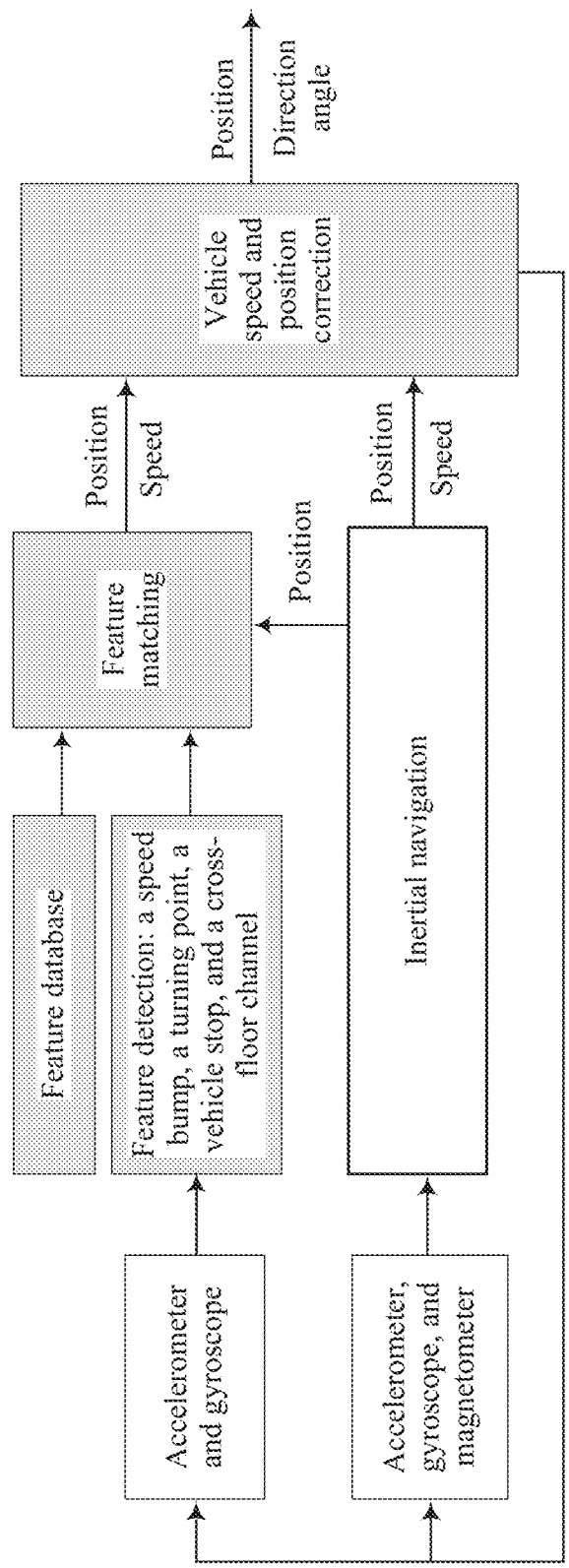
FIG. 15 is a schematic structural diagram of a combination of a positioning solution provided in some embodiments of the present invention and an inertial navigation positioning technology.

Specifically, FIG. 15 is a schematic structural diagram of a combination of a positioning solution provided in some embodiments of the present invention and an inertial navigation positioning technology.

As shown in FIG. 15, a feature database includes position distribution of a speed bump, position distribution of a road turning point, a position of a cross-floor channel, and a connected floor, and the data may be manually recorded in advance, to complete the feature database.

A mobile device may perform feature detection based on sensor data, and specifically, may determine, by using the sensor (for example, accelerometer or gyroscope) data and the positioning solution provided in the embodiments of the present invention, whether a vehicle passes through a position (a speed bump, a turning point, or a cross-floor channel) having a natural feature in an environment, or whether a vehicle stops.

Further, the mobile device may perform feature matching, and compare a position that is output based on the sensor data through inertial navigation with a feature event (that is, a preset state) that is determined by using the positioning solution provided in the embodiments of the present invention, to find, from the feature database, a feature (that is, a position reference value corresponding to the preset state) corresponding to the feature event that is currently detected, and/or may determine a speed reference value based on the sensor data.

Further, the mobile device may correct the estimated speed value and the estimated positioning value of the vehicle, and specifically, may correct, by using a method such Kalman filtering or particle filtering and by using the position reference value and/or the speed reference value of the vehicle that are/is obtained through the feature detection and the feature matching, the positioning estimation and the estimated speed of the vehicle that are output through inertial navigation, and also compensate for a sensor bias.

It can be learned that in a scenario of combining the positioning solution provided in the embodiments of the present invention and the inertial navigation positioning technology, the position having a natural feature in the environment can be detected by using the sensor, so as to obtain the position reference value and the speed reference value of the vehicle, and further correct the estimated positioning value and the estimated speed value of the vehicle that are output through inertial navigation positioning. Indoor vehicle positioning is implemented by using only the sensor without depending on a radio signal positioning system, and therefore, a requirement and a limitation of the radio signal positioning technology on radio signal distribution can be avoided. In addition, the sensor bias may be compensated for, and position error accumulation existing in inertial navigation may be eliminated, thereby improving positioning precision, and correcting the error accumulation in inertial navigation and the sensor bias.

B. A combination of the positioning solution provided in the embodiments of the present invention and the radio signal positioning technology.

The positioning solution provided in the embodiments of the present invention and the radio signal positioning technology are combined, so that a position with a natural feature in an environment can also be detected by using a sensor, to obtain a position reference value and a speed reference value of a vehicle, so as to correct an estimated positioning value and an estimated speed value of the vehicle that are output by a radio signal positioning system, thereby reducing a positioning time lag of the radio signal positioning system, and improving positioning precision.

Figure 16:
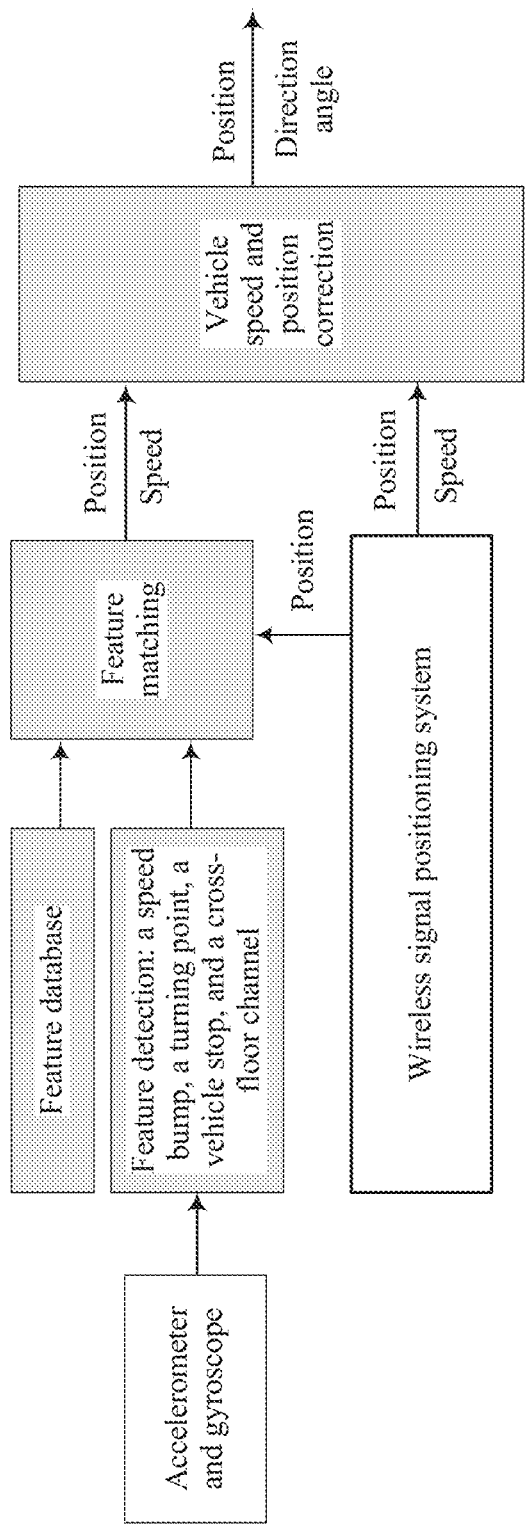
FIG. 16 is a schematic structural diagram of a combination of a positioning solution provided in some embodiments of the present invention and a radio signal positioning technology.

Specifically. FIG. 16 is a schematic structural diagram of a combination of a positioning solution provided in some embodiments of the present invention and a radio signal positioning technology.

As shown in FIG. 16, for details of a feature database, feature detection, and feature matching, refer to the descriptions, in the foregoing embodiment, of the schematic structural diagram of the combination of the positioning solution provided in some embodiments of the present invention and the inertial navigation positioning technology. Further, a mobile device may correct the estimated speed value and the estimated positioning value of the vehicle, and specifically, may correct, by using a method such as Kalman filtering or particle filtering and by using the position reference value and/or the speed reference value of the vehicle that are/is obtained through the feature detection and the feature matching, the estimated positioning value and the estimated speed value of the vehicle that are output by the radio signal positioning system.

It can be learned that in a scenario of combining the positioning solution provided in the embodiments of the present invention and the radio signal positioning technology, the position with a natural feature in the environment can be detected by using the sensor, so as to obtain the position reference value and the speed reference value of the vehicle, and further correct the estimated positioning value and the estimated speed value of the vehicle that are output through radio signal positioning, thereby reducing a positioning time lag of the radio signal positioning system, and improving positioning precision.

C. A combination of the positioning solution provided in the embodiments of the present invention and the technology that integrates inertial navigation positioning and radio signal positioning.

The positioning solution provided in the embodiments of the present invention and the technology that integrates inertial navigation positioning and radio signal positioning are combined, so that a position with a natural feature in an environment can also be detected by using a sensor, to obtain a position reference value and a speed reference value of a vehicle, so as to correct an estimated positioning value and an estimated speed value of the vehicle that are output by an integrated positioning system, thereby improving positioning precision.

Figure 17:
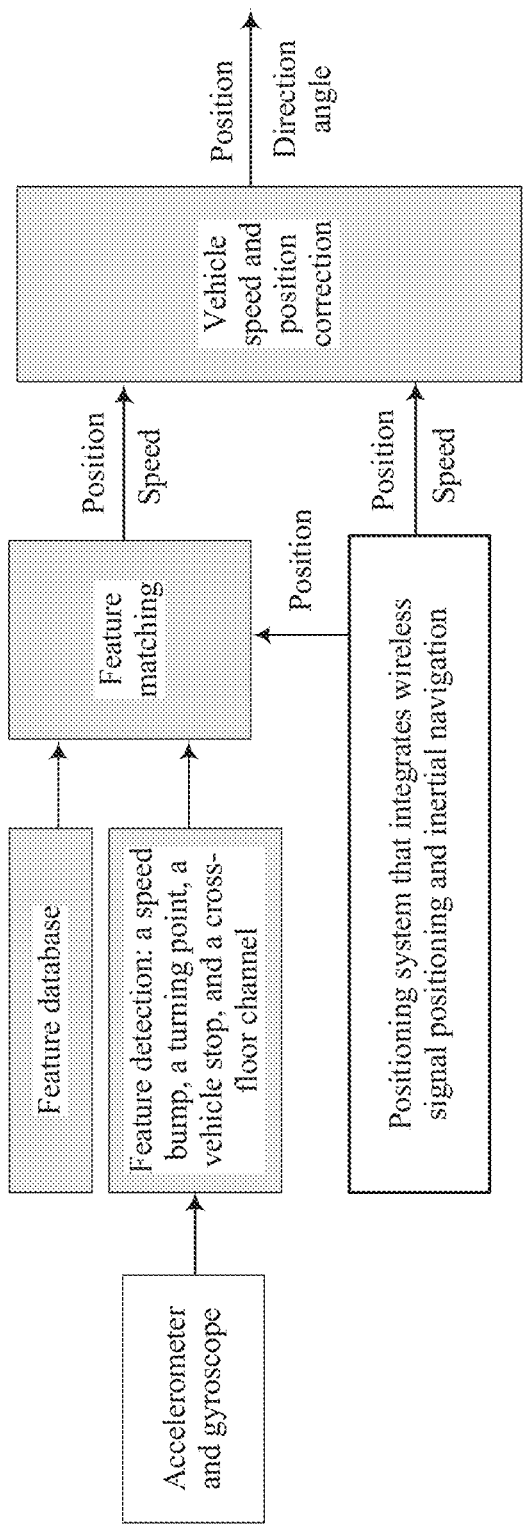
FIG. 17 is a schematic structural diagram of a combination of a positioning solution provided in some embodiments of the present invention and a technology that integrates inertial navigation positioning and radio signal positioning.

Specifically, FIG. 17 is a schematic structural diagram of a combination of a positioning solution provided in some embodiments of the present invention and a technology that integrates inertial navigation positioning and radio signal positioning.

As shown in FIG. 17, for details of a feature database, feature detection, and feature matching, refer to the descriptions, in the foregoing embodiment, of the schematic structural diagram of the combination of the positioning solution provided in some embodiments of the present invention and the inertial navigation positioning technology. Further, a mobile device may correct the estimated speed value and the estimated positioning value of the vehicle, and specifically, may correct, by using a method such as Kalman filtering or particle filtering and by using the position reference value and/or the speed reference value of the vehicle that are/is obtained through the feature detection and the feature matching, the estimated positioning value and the estimated speed value of the vehicle that are output by the positioning system that integrates radio signal positioning and inertial navigation.

It can be learned that in a scenario of combining the positioning solution provided in the embodiments of the present invention and the technology that integrates radio signal positioning and inertial navigation, the position with a natural feature in the environment can be detected by using the sensor, so as to obtain the position reference value and the speed reference value of the vehicle, and further correct the estimated positioning value and the estimated speed value of the vehicle that are output by the integrated positioning system, thereby improving positioning precision.

It can be learned from the descriptions of the foregoing scenarios that when there is no radio signal distribution or density of radio signal distribution is low, by combining the positioning solution provided in the embodiments of the present invention and the inertial navigation positioning technology, vehicle positioning can depend on only a sensor. Therefore, when vehicle positioning is performed by using the positioning solution provided in the embodiments of the present invention, there is no requirement for radio signal distribution in an environment, and the positioning solution is applicable to a wide range. In addition, a sensor bias can be compensated for, and positioning precision can be improved. If positioning is performed when there is a radio signal, a positioning lag is caused due to a transmission delay of the radio signal, and signal distribution changes due to reflection of the radio signal and a change of the environment, and consequently positioning precision is lowered. Therefore, when vehicle positioning is performed by using the positioning solution provided in the embodiments of the present invention, positioning precision can be improved, and a positioning time lag can be reduced.

In conclusion, according to the positioning solution provided in the embodiments of the present invention, each time it is determined that the mobile device is in the preset state, the mobile device can correct, by using the speed reference value obtained based on the data detected by the sensor system and/or the position reference value obtained based on the estimated positioning value output by the positioning system and the preset map data, the estimated speed value and/or the estimated positioning value that are/is output by the positioning system. Because the speed reference value is directly obtained based on real-time data that is detected by the sensor system when the mobile device is in the preset state, compared with the estimated speed value output by the positioning system, the speed reference value is not affected by error accumulation in the system, and is not limited by a positioning technology used in the positioning system. In addition, the preset map data reflects an actual geographical position status. When a terminal device is in the preset state, the position reference value obtained by combining the estimated positioning value and the preset map data can actually reflect a geographical position at which the mobile device is currently located. Therefore, according to the positioning solution provided in the embodiments of the present invention, the estimated speed value and/or the estimated positioning value are/is corrected by using the speed reference value and/or the position reference value, so that positioning precision can be effectively improved.

Based on a same technical concept, an embodiment of the present invention further provides a mobile device having a sensor system and a positioning system. The mobile device may perform the foregoing positioning method embodiment of the present invention. A function module, in the mobile device, that is configured to implement the foregoing positioning method embodiment of the present invention may be specifically implemented through software programming or a combination of software and hardware.

Figure 18:
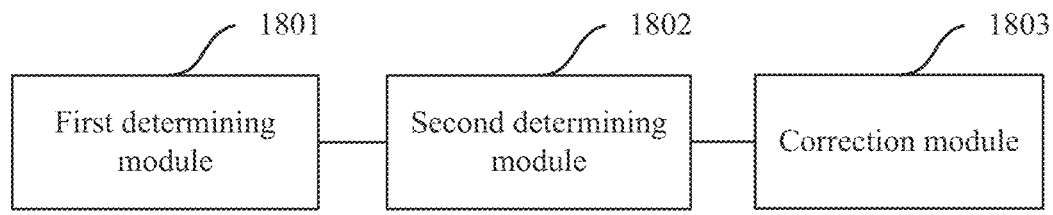
FIG. 18 is a schematic structural diagram of a mobile device according to some embodiments of the present invention.

FIG. 18 is a schematic structural diagram of a mobile device according to some embodiments of the present invention. As shown in FIG. 18, the mobile device includes:

a first determining module 1801, configured to determine that the mobile device is in a preset state;

a second determining module 1802, configured to: determine a speed reference value of the mobile device based on data detected by the sensor system, and determine a position reference value of the mobile device based on preset map data and an estimated positioning value that is output by the positioning system; and a correction module 1803, configured to correct, based on the speed reference value and the position reference value, an estimated speed value and the estimated positioning value that are output by the positioning system.

In some embodiments of the present invention, the mobile device further includes a compensation module, configured to perform bias compensation on the sensor system based on at least one of the speed reference value or the position reference value.

Specifically, for example, the preset state may include at least the following: a vehicle in which the mobile device is located passes through a speed bump; or a vehicle in which the mobile device is located passes through a road turning point; or a vehicle in which the mobile device is located passes through a cross-floor channel.

Specifically, when the preset state is that the vehicle in which the mobile device is located passes through a speed bump, the second determining module 1802 is specifically configured to:

based on times at which a front wheel and a rear wheel of the vehicle respectively pass through the speed bump and that are detected by the sensor system, obtain the speed reference value by dividing a value of a distance between the front wheel and the rear wheel of the vehicle in which the mobile device is located by an absolute value of a time difference between the times at which the front wheel and the rear wheel of the vehicle pass through the speed bump.

Specifically, when the preset state is that the vehicle in which the mobile device is located passes through a road turning point, the second determining module 1802 is specifically configured to:

based on a centripetal acceleration value and a rotation angular velocity value that are detected by the sensor system, obtain the speed reference value by dividing the centripetal acceleration value by the rotation angular velocity value.

Specifically, when the preset state is that the vehicle in which the mobile device is located passes through a cross-floor channel, the second determining module 1802 is specifically configured to:

based on a start time and an end time at which the vehicle passes through the cross-floor channel and that are detected by the sensor system, obtain the speed reference value by dividing a length value of the cross-floor channel by an absolute value of a time difference between the start time and the end time at which the vehicle in which the mobile device is located passes through the cross-floor channel.

Specifically, when the preset state is that the vehicle in which the mobile device is located passes through a speed bump, the second determining module 1802 is specifically configured to:

search for, based on position distribution of a speed bump in the preset map data, a position of a speed bump closest to the estimated positioning value output by the positioning system, and determine the position of the found speed bump as the position reference value of the mobile device.

Specifically, when the preset state is that the vehicle in which the mobile device is located passes through a road turning point, the second determining module 1802 is specifically configured to:

search for, based on position distribution of a road turning point in the preset map data, a position of a road turning point closest to the estimated positioning value output by the positioning system, and determine the position of the found road turning point as the position reference value of the mobile device.

Specifically, when the preset state is that the vehicle in which the mobile device is located passes through a cross-floor channel, the second determining module 1802 is specifically configured to:

search for, based on position distribution of a cross-floor channel in the preset map data, a position of a cross-floor channel closest to the estimated positioning value output by the positioning system, and determine the position of the found cross-floor channel as the position reference value of the mobile device.

Specifically, the first determining module 1801 is specifically configured to:

if the first determining module 1801 determines that data detected by at least one sensor in the sensor system suddenly changes twice in an oscillation manner in preset duration, determine that the vehicle in which the mobile device is located passes through a speed bump; or if the first determining module 1801 determines that an absolute value of a rotation angular velocity detected by the sensor system is greater than a rotation angular velocity threshold, or if it is determined that an absolute value of a centripetal acceleration detected by the sensor system is greater than a centripetal acceleration threshold, determine that the vehicle in which the mobile device is located passes through a road turning point; or if the first determining module 1801 determines that an absolute value of a component that is in a direction perpendicular to a vehicle chassis and that is of an acceleration value detected by the sensor system is less than an acceleration threshold, determine that the vehicle in which the mobile device is located passes through a cross-floor channel.

Based on a same inventive concept, for a problem-resolving principle and beneficial effects of modules in the mobile device provided in the foregoing embodiment of the present invention, refer to the implementation and the brought beneficial effects of the foregoing method embodiment. Therefore, for implementation of the mobile device, refer to the implementation of the method embodiment. Repeated parts are not described again.

Based on a same technical concept, an embodiment of the present invention further provides a mobile device having a sensor system and a positioning system. The mobile device may perform the foregoing positioning method embodiment of the present invention. A function module, in the mobile device, that is configured to implement the foregoing positioning method embodiment of the present invention may be specifically implemented through software programming or a combination of software and hardware.

Figure 19:
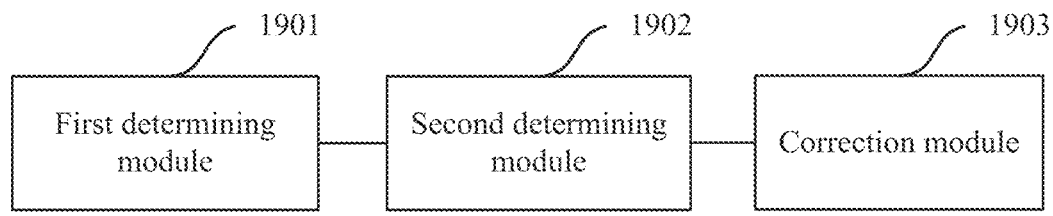
FIG. 19 is a schematic structural diagram of a mobile device according to some embodiments of the present invention.

FIG. 19 is a schematic structural diagram of a mobile device according to some embodiments of the present invention. As shown in FIG. 19, the mobile device includes:

a first determining module 1901, configured to determine that the mobile device is in a preset state;

a second determining module 1902, configured to determine a speed reference value of the mobile device based on data detected by the sensor system; and a correction module 1903, configured to correct, based on the speed reference value, an estimated speed value output by the positioning system.

In some embodiments of the present invention, the mobile device further includes a compensation module, configured to perform bias compensation on the sensor system based on the speed reference value.

Specifically, for example, the preset state includes at least the following: a vehicle in which the mobile device is located passes through a speed bump; or a vehicle in which the mobile device is located passes through a road turning point; or a vehicle in which the mobile device is located passes through a cross-floor channel; or a vehicle in which the mobile device is located stops.

Specifically, when the preset state is that the vehicle in which the mobile device is located passes through a speed bump, the second determining module 1902 is specifically configured to:

based on times at which a front wheel and a rear wheel of the vehicle respectively pass through the speed bump and that are detected by the sensor system, obtain the speed reference value by dividing a value of a distance between the front wheel and the rear wheel of the vehicle in which the mobile device is located by an absolute value of a time difference between the times at which the front wheel and the rear wheel of the vehicle pass through the speed bump.

Specifically, when the preset state is that the vehicle in which the mobile device is located passes through a road turning point, the second determining module 1902 is specifically configured to:

based on a centripetal acceleration value and a rotation angular velocity value that are detected by the sensor system, obtain the speed reference value by dividing the centripetal acceleration value by the rotation angular velocity value.

Specifically, when the preset state is that the vehicle in which the mobile device is located passes through a cross-floor channel, the second determining module 1902 is specifically configured to:

based on a start time and an end time at which the vehicle passes through the cross-floor channel and that are detected by the sensor system, obtain the speed reference value by dividing a length value of the cross-floor channel by an absolute value of a time difference between the start time and the end time at which the vehicle in which the mobile device is located passes through the cross-floor channel.

Specifically, when the preset state is that the vehicle in which the mobile device is located stops, the second determining module 1902 is specifically configured to:

when a variance of a plurality of pieces of consecutive data in at least one spatial dimension that are detected by the sensor system is less than a threshold, determine that the speed reference value of the mobile device is zero.

Specifically, the first determining module 1901 is specifically configured to:

if the first determining module 1901 determines that data detected by at least one sensor in the sensor system suddenly changes twice in an oscillation manner in preset duration, determine that the vehicle in which the mobile device is located passes through a speed bump; or if the first determining module 1901 determines that an absolute value of a rotation angular velocity detected by the sensor system is greater than a rotation angular velocity threshold, or if it is determined that an absolute value of a centripetal acceleration detected by the sensor system is greater than a centripetal acceleration threshold, determine that the vehicle in which the mobile device is located passes through a road turning point; or if the first determining module 1901 determines that an absolute value of a component that is in a direction perpendicular to a vehicle chassis and that is of an acceleration value detected by the sensor system is less than an acceleration threshold, determine that the vehicle in which the mobile device is located passes through a cross-floor channel; or if the first determining module 1901 determines that the variance of the plurality of pieces of consecutive data in the at least one spatial dimension that are detected by the sensor system is less than the threshold, determine that the vehicle in which the mobile device is located stops.

Based on a same inventive concept, for a problem-resolving principle and beneficial effects of modules in the mobile device provided in the foregoing embodiment of the present invention, refer to the implementation and the brought beneficial effects of the foregoing method embodiment. Therefore, for implementation of the mobile device, refer to the implementation of the method embodiment. Repeated parts are not described again.

Based on a same technical concept, an embodiment of the present invention further provides a mobile device having a sensor system and a positioning system. The mobile device may perform the foregoing positioning method embodiment of the present invention. A function module, in the mobile device, that is configured to implement the foregoing positioning method embodiment of the present invention may be specifically implemented through software programming or a combination of software and hardware.

Figure 20:
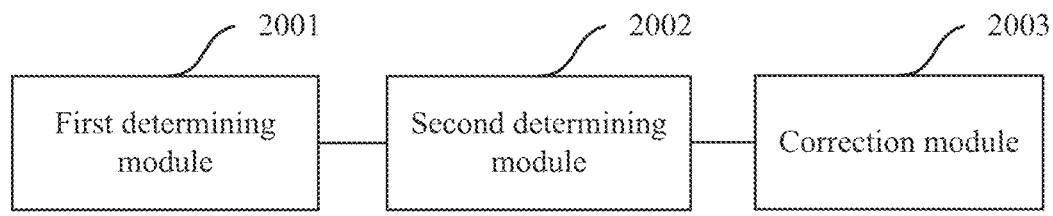
FIG. 20 is a schematic structural diagram of a mobile device according to some embodiments of the present invention.

FIG. 20 is a schematic structural diagram of a mobile device according to some embodiments of the present invention. As shown in FIG. 20, the mobile device includes:

a first determining module 2001, configured to determine that the mobile device is in a preset state:

a second determining module 2002, configured to determine a position reference value of the mobile device based on preset map data and an estimated positioning value that is output by the positioning system; and a correction module 2003, configured to correct, based on the position reference value, the estimated positioning value output by the positioning system.

In some embodiments of the present invention, the mobile device further includes a compensation module, configured to perform bias compensation on the sensor system based on the position reference value.

Specifically, for example, the preset state includes at least the following: a vehicle in which the mobile device is located passes through a speed bump; or a vehicle in which the mobile device is located passes through a road turning point; or a vehicle in which the mobile device is located passes through a cross-floor channel.

Specifically, when the preset state is that the vehicle in which the mobile device is located passes through a speed bump, the second determining module 2002 is specifically configured to:

search for, based on position distribution of a speed bump in the preset map data, a position of a speed bump closest to the estimated positioning value output by the positioning system, and determine the position of the found speed bump as the position reference value of the mobile device.

Specifically, when the preset state is that the vehicle in which the mobile device is located passes through a road turning point, the second determining module 2002 is specifically configured to:

search for, based on position distribution of a road turning point in the preset map data, a position of a road turning point closest to the estimated positioning value output by the positioning system, and determine the position of the found road turning point as the position reference value of the mobile device.

Specifically, when the preset state is that the vehicle in which the mobile device is located passes through a cross-floor channel, the second determining module 2002 is specifically configured to:

search for, based on position distribution of a cross-floor channel in the preset map data, a position of a cross-floor channel closest to the estimated positioning value output by the positioning system, and determine the position of the found cross-floor channel as the position reference value of the mobile device.

Specifically, the first determining module 2001 is specifically configured to:

if the first determining module 2001 determines that data detected by at least one sensor in the sensor system suddenly changes twice in an oscillation manner in preset duration, determine that the vehicle in which the mobile device is located passes through a speed bump; or if the first determining module 2001 determines that an absolute value of a rotation angular velocity detected by the sensor system is greater than a rotation angular velocity threshold, or if it is determined that an absolute value of a centripetal acceleration detected by the sensor system is greater than a centripetal acceleration threshold, determine that the vehicle in which the mobile device is located passes through a road turning point; or if the first determining module 2001 determines that an absolute value of a component that is in a direction perpendicular to a vehicle chassis and that is of an acceleration value detected by the sensor system is less than an acceleration threshold, determine that the vehicle in which the mobile device is located passes through a cross-floor channel.

Based on a same inventive concept, for a problem-resolving principle and beneficial effects of modules in the mobile device provided in the foregoing embodiment of the present invention, refer to the implementation and the brought beneficial effects of the foregoing method embodiment. Therefore, for implementation of the mobile device, refer to the implementation of the method embodiment. Repeated parts are not described again.

Based on a same technical concept, an embodiment of the present invention further provides a mobile device, and the mobile device may implement the positioning procedure described in the foregoing method embodiment.

Figure 21:
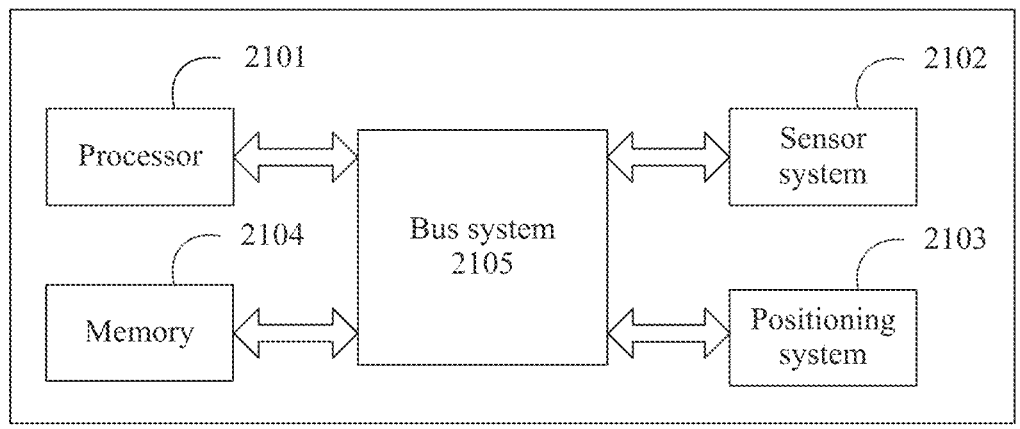
FIG. 21 is a schematic structural diagram of a mobile device according to some embodiments of the present invention.

Referring to FIG. 21, FIG. 21 is a schematic structural diagram of a mobile device according to an embodiment of the present invention, and the terminal may include: one or more processors 2101, a sensor system 2102, a positioning system 2103, a memory 2104, a bus system 2105, and one or more programs. The one or more processors 2101, the sensor system 2102, the positioning system 2103, and the memory 2104 are connected by using the bus system 2105. The one or more programs are stored in the memory 2104, the one or more programs include an instruction, and the mobile device performs the positioning method described in the foregoing embodiments of the present invention when the processor 2101 executes the instruction.

Based on a same technical concept, an embodiment of the present invention further provides a computer readable storage medium storing one or more programs. The one or more programs include an instruction, and a mobile device performs the positioning method described in the foregoing embodiments of the present invention when the mobile device executes the instruction. For details, refer to the descriptions in the foregoing embodiments, and details are not described herein in this application.

Based on a same technical concept, an embodiment of the present invention further provides a graphical user interface on a mobile device. The mobile device includes a display, a sensor system, a positioning system, a memory, a plurality of application programs, and one or more processors configured to execute one or more programs stored in the memory. The graphical user interface includes a user interface that is displayed by using the positioning method described in the foregoing embodiments of the present invention. The display includes a touch-sensitive surface and a display screen. For details, refer to the descriptions in the foregoing embodiments, and details are not described herein in this application.

For software implementation, the technologies may be implemented by using a module (for example, a program module and a function module) that implements a function described herein. Software code may be stored in a memory unit and executed by a processor. The memory unit may be implemented inside the processor or outside the processor.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A positioning method, wherein the method is applied to a mobile device having a sensor system and a positioning system, and wherein the positioning method comprises:
    determining that the mobile device is in a preset state;
    determining a speed reference value of the mobile device based on data detected by the sensor system, wherein when the preset state is when the vehicle in which the mobile device is located passes over a speed bump, determining the speed reference value of the mobile device based on the data detected by the sensor system comprises:
        determining whether a sampling amplitude value of an accelerometer of the mobile device exceeds a first threshold;
        determining that a speed bump impact event occurs at a first moment t0 when the sampling amplitude exceeds the first threshold;
        specifying a time window [t0, t0+Tb], where Tb is a length of the time window;
        recording all moments at which the sampling amplitude value exceeds the first threshold within the time window, wherein the moments constitute a first set of multiple times;
        calculating moment differences by calculating a difference between each adjacent moment of the moments;
        calculating a maximum moment difference of the moment differences;
        determining whether the maximum moment difference is greater than a second threshold;
        classifying the first set into a second set of multiple times and a third set of multiple times when the maximum moment difference is greater than the second threshold;
        determining a first average of the second set;
        determining a second average of the third set; and
        determining the speed reference value by dividing an axle distance between a front wheel of the vehicle and a rear wheel of the vehicle by a difference between the first average and the second average;
    receiving preset map data from a second device, wherein the preset map data includes multiple preset locations of multiple road features of different types of road features, wherein the multiple road features include multiple first road features of a first type corresponding to the preset state, and wherein the different types of road features include speed bumps;
    selecting one of the multiple preset locations of one of the multiple first road features of the first type in the preset map data based on the preset state and an estimated positioning value that is output by the positioning system;
    determining a position reference value of the mobile device based on the one of the multiple preset locations;
    correcting, based on the speed reference value and the position reference value, an estimated speed value and the estimated positioning value that are output by the positioning system; and
    performing bias compensation on the sensor system based on at least one of the speed reference value or the position reference value.

2. The positioning method of claim 1, wherein the preset state comprises at least one of:
when a vehicle in which the mobile device is located passes over the speed bump;
when the vehicle in which the mobile device is located passes through a road turning point; or
when the vehicle in which the mobile device is located passes through a cross-floor channel.

3. The positioning method of claim 1, wherein the preset state is when the vehicle in which the mobile device is located passes over the speed bump.

4. The positioning method of claim 1, wherein when the preset state is when the vehicle in which the mobile device is located passes through a road turning point, determining the speed reference value of the mobile device based on the data detected by the sensor system comprises obtaining the speed reference value based on a centripetal acceleration value and a rotation angular velocity value that are detected by the sensor system by dividing the centripetal acceleration value by the rotation angular velocity value.

5. The positioning method of claim 1, wherein when the preset state is when the vehicle in which the mobile device is located passes through a cross-floor channel, determining the speed reference value of the mobile device based on the data detected by the sensor system comprises obtaining the speed reference value based on a start time and an end time at which the vehicle passes through the cross-floor channel and that are detected by the sensor system by dividing a length value of the cross-floor channel by an absolute value of a time difference between the start time and the end time at which the vehicle in which the mobile device is located passes through the cross-floor channel.

6. The positioning method of claim 1, wherein when the preset state is when the vehicle in which the mobile device is located passes over the speed bump, determining the position reference value of the mobile device comprises:
searching for, based on preset positions of the speed bumps in the preset map data, a position of a first speed bump of the speed bumps that is closest to the estimated positioning value output by the positioning system; and
determining the position of the first speed bump as the position reference value of the mobile device.

7. The positioning method of claim 1, wherein when the preset state is when the vehicle in which the mobile device is located passes through a road turning point, determining the position reference value of the mobile device based on the preset map data and the estimated positioning value that is output by the positioning system comprises searching for, based on position distribution of a road turning point in the preset map data, a position of a road turning point closest to the estimated positioning value output by the positioning system and determining the position of the road turning point closest to the estimated positioning value as the position reference value of the mobile device.

8. The positioning method of claim 1, wherein when the preset state is when the vehicle in which the mobile device is located passes through a cross-floor channel, determining the position reference value of the mobile device based on the preset map data and the estimated positioning value that is output by the positioning system comprises searching for, based on position distribution of a cross-floor channel in the preset map data, a position of a cross-floor channel closest to the estimated positioning value output by the positioning system and determining the position of the cross-floor channel closest to the estimated positioning value as the position reference value of the mobile device.

9. The positioning method of claim 1, wherein determining that the mobile device is in the preset state comprises determining that a vehicle in which the mobile device is located passes over the speed bump when data detected by at least one sensor in the sensor system suddenly changes twice in an oscillation manner in a preset duration.

10. The positioning method of claim 1, wherein determining that the mobile device is in the preset state comprises determining that a vehicle in which the mobile device is located passes through a road turning point either when an absolute value of a rotation angular velocity detected by the sensor system is greater than a rotation angular velocity threshold or when an absolute value of a centripetal acceleration detected by the sensor system is greater than a centripetal acceleration threshold.

11. The positioning method of claim 1, wherein determining that the mobile device is in the preset state comprises determining that a vehicle in which the mobile device is located passes through a road turning point either when an absolute value of a centripetal acceleration detected by the sensor system is greater than a centripetal acceleration threshold.

12. A mobile device comprising:
at least one processor;
a sensor system coupled to the at least one processor;
a positioning system coupled to the at least one processor; and
a non-transitory computer-readable storage medium coupled to the at least one processor and storing program instructions for execution by the at least one processor, wherein the program instructions cause the at least one processor to:
determine that the mobile device is in a preset state;
determine a speed reference value of the mobile device based on data detected by the sensor system, wherein when the preset state is when the vehicle in which the mobile device is located passes over a speed bump, the program instructions cause the at least one processor to determine the speed reference value of the mobile device by causing the at least one processor to:
determine whether a sampling amplitude value of an accelerometer of the mobile device exceeds a first threshold;
determine that a speed bump impact event occurs at a first moment t0 when the sampling amplitude exceeds the first threshold;
specify a time window [t0, t0+Tb], where Tb is a length of the time window;
record all moments at which the sampling amplitude value exceeds the first threshold within the time window, wherein the moments constitute a first set of multiple times;
calculate moment differences by calculating a difference between each adjacent moment of the moments;
calculate a maximum moment difference of the moment differences;
determine whether the maximum moment difference is greater than a second threshold;
classify the first set into a second set of multiple times and a third set of multiple times when the maximum moment difference is greater than the second threshold;

determine a first average of the second set;
determine a second average of the third set; and
determine the speed reference value by dividing an axle distance between a front wheel of the vehicle and a rear wheel of the vehicle by a difference between the first average and the second average;
receive preset map data from a second device, wherein the preset map data includes multiple preset locations of multiple road features of different types of road features, wherein the multiple road features include multiple first road features of a first type corresponding to the preset state, and wherein the different types of road features include speed bumps;
select one of the multiple preset locations of one of the multiple first road features of the first type in the preset map data based on the preset state and an estimated positioning value that is output by the positioning system;
determine a position reference value of the mobile device based on the one of the multiple preset locations;
correct, based on the speed reference value and the position reference value, an estimated speed value and the estimated positioning value that are output by the positioning system; and
perform bias compensation on the sensor system based on at least one of the speed reference value or the position reference value.

13. The mobile device of claim 12, wherein the preset state comprises at least one of:
when a vehicle in which the mobile device is located passes over the speed bump;
when the vehicle in which the mobile device is located passes through a road turning point; or
when the vehicle in which the mobile device is located passes through a cross-floor channel.

14. The mobile device of claim 12, wherein when the preset state is when the vehicle in which the mobile device is located passes over the speed bump.

15. The mobile device of claim 12, wherein when the preset state is when the vehicle in which the mobile device is located passes through a road turning point, the program instructions cause the at least one processor to determine the speed reference value of the mobile device based on data detected by the sensor system based on a centripetal acceleration value and a rotation angular velocity value that are detected by the sensor system by dividing the centripetal acceleration value by the rotation angular velocity value.

16. The mobile device of claim 12, wherein when the preset state is when the vehicle in which the mobile device is located passes through a cross-floor channel, the program instructions cause the at least one processor to determine the speed reference value of the mobile device based on data detected by the sensor system based on a start time and an end time at which the vehicle passes through the cross-floor channel and that are detected by the sensor system by dividing a length value of the cross-floor channel by an absolute value of a time difference between the start time and the end time at which the vehicle in which the mobile device is located passes through the cross-floor channel.

17. The mobile device of claim 12, wherein when the preset state is when the vehicle in which the mobile device is located passes over the speed bump, the program instructions cause the at least one processor to:
determine the position reference value of the mobile device based on preset map data and an estimated positioning value that is output by the positioning system based on position distribution of a speed bump in the preset map data and a position of a speed bump closest to the estimated positioning value output by the positioning system; and
determine the position of the speed bump closest to the estimated positioning value as the position reference value of the mobile device.

18. The mobile device of claim 12, wherein when the preset state is when the vehicle in which the mobile device is located passes through a road turning point, the program instructions cause the at least one processor to:
determine a position reference value of the mobile device based on preset map data and an estimated positioning value that is output by the positioning system based on position distribution of a road turning point in the preset map data and a position of a road turning point closest to the estimated positioning value output by the positioning system; and
determine the position of the road turning point closest to the estimated positioning value as the position reference value of the mobile device.

19. The mobile device of claim 12, wherein when the preset state is when the vehicle in which the mobile device is located passes through a cross-floor channel, the program instructions cause the at least one processor to:
determine a position reference value of the mobile device based on preset map data and an estimated positioning value that is output by the positioning system based on position distribution of a cross-floor channel in the preset map data and a position of a cross-floor channel closest to the estimated positioning value output by the positioning system; and
determine the position of the cross-floor channel closest to the estimated positioning value as the position reference value of the mobile device.

20. The mobile device of claim 12, wherein determining that the mobile device is in the preset state comprises at least one of:
determining that a vehicle in which the mobile device is located passes over the speed bump when the data detected by a sensor in the sensor system suddenly changes twice in an oscillation manner in a preset duration;
determining that the vehicle in which the mobile device is located passes through a road turning point either when an absolute value of a rotation angular velocity detected by the sensor system is greater than a rotation angular velocity threshold or when a centripetal acceleration detected by the sensor system is greater than a centripetal acceleration threshold; or
determining that the vehicle in which the mobile device is located passes through a cross-floor channel when an absolute value of a component that is in a direction perpendicular to a vehicle chassis and that is of an acceleration value detected by the sensor system is less than an acceleration threshold.

* * * * *

UNITED STATES PATENT AND TRADEMARK OFFICE
CERTIFICATE OF CORRECTION

PATENT NO. : 11,118,913 B2
APPLICATION NO. : 16/342663
DATED : September 14, 2021
INVENTOR(S) : Xiaohan Chen Page 1 of 1

It is certified that error appears in the above-identified patent and that said Letters Patent is hereby corrected as shown below:

On the Title Page

Page 2, Column 1, Cited References, Foreign Patent Documents: "CN 101796375 A 6/2010" should read "CN 101796375 A 8/2010"

Page 2, Column 2, Cited References, Other Publications: "le;2qMachine Translation and Abstract of Chinese Publication No. CN101696886, Apr. 21,2010,16 pages." should read "Machine Translation and Abstract of Chinese Publication No. CN101696886, Apr. 21,2010,16 pages."

Signed and Sealed this
Seventh Day of December, 2021

Drew Hirshfeld
*Performing the Functions and Duties of the
Under Secretary of Commerce for Intellectual Property and
Director of the United States Patent and Trademark Office*